(12) United States Patent
Kourogi et al.

(10) Patent No.: US 7,551,342 B2
(45) Date of Patent: Jun. 23, 2009

(54) OPTICAL FREQUENCY COMB GENERATOR AND OPTICAL MODULATOR

(75) Inventors: Motonobu Kourogi, Kanagawa (JP); Kazuhiro Imai, Kanagawa (JP); Widiyatmoko Bambang, Kanagawa (JP)

(73) Assignee: Optical Comb Institute, Inc., Tokyo (JP)

( * ) Notice: Subject to any disclaimer, the term of this patent is extended or adjusted under 35 U.S.C. 154(b) by 441 days.

(21) Appl. No.: 10/579,262

(22) PCT Filed: Nov. 4, 2004

(86) PCT No.: PCT/JP2004/016325

§ 371 (c)(1),
(2), (4) Date: May 10, 2006

(87) PCT Pub. No.: WO2005/047965

PCT Pub. Date: May 26, 2005

(65) Prior Publication Data

US 2007/0076282 A1    Apr. 5, 2007

(30) Foreign Application Priority Data

Nov. 14, 2003 (JP) ............................. 2003-385449
Nov. 14, 2003 (JP) ............................. 2003-385450

(51) Int. Cl.
*G02F 1/01* (2006.01)

(52) U.S. Cl. ..................... 359/279; 359/247; 359/245; 359/263; 359/287

(58) Field of Classification Search ................. 359/245, 359/247, 263, 279, 287; 385/3
See application file for complete search history.

(56) References Cited

U.S. PATENT DOCUMENTS 3,676,796 A    7/1972    Weber ........................ 331/94.5
4,861,136 A    8/1989    Stone et al. ................. 350/96.3

(Continued)

FOREIGN PATENT DOCUMENTS

JP           5-323265         12/1993

(Continued)

*Primary Examiner*—Joseph Martinez
(74) *Attorney, Agent, or Firm*—Haverstock & Owens LLP

(57) ABSTRACT

A resonance system (14, 15) is formed by a light incident side reflection mirror and a light exiting side reflecting mirror, arranged parallel to each other. The light incident on an incident side reflective mirror (14) is propagated in the outward path direction or in the backward path direction so that the light is set in a resonant state. The light in the resonant state in the resonance system (14, 15) is phase-modulated, responsive to a modulating signal supplied from an oscillating device (16) by a light modulation device (2) arranged between the light incident side reflective mirror (14) and the light exiting side reflective mirror (15). The oscillating device oscillates the modulating signal of a frequency $f_m$. A plural number of sidebands, centered about the frequency of the incident light, are generated with an interval between neighboring sidebands equal to the frequency of the modulating signal, such as to modulate the phase of the light in the outward path direction and the phase of the light in the backward path direction.

12 Claims, 16 Drawing Sheets

U.S. PATENT DOCUMENTS

| | | | |
|---|---|---|---|
| 4,893,353 A | 1/1990 | Iwaoka et al. | 455/612 |
| 4,942,588 A | 7/1990 | Yasui et al. | 372/103 |
| 5,274,650 A | 12/1993 | Amano | 372/21 |
| 5,291,568 A | 3/1994 | Uemiya et al. | 385/31 |
| 5,377,291 A | 12/1994 | Hatakoshi et al. | 385/122 |
| 5,432,807 A | 7/1995 | Okazaki et al. | 372/22 |
| 5,835,522 A | 11/1998 | King et al. | 372/97 |
| 6,072,197 A | 6/2000 | Horino et al. | 257/103 |
| 6,201,638 B1 * | 3/2001 | Hall et al. | 359/346 |
| 6,473,218 B1 | 10/2002 | Maleki et al. | 359/245 |
| 6,501,868 B1 | 12/2002 | Kitaoka et al. | 385/14 |
| 6,671,297 B2 | 12/2003 | Takayama | 372/22 |
| 6,795,481 B2 | 9/2004 | Maleki et al. | 372/108 |
| 6,839,365 B1 | 1/2005 | Sonoda et al. | 372/22 |
| 6,845,121 B2 | 1/2005 | McDonald | 372/703 |
| 6,871,025 B2 | 3/2005 | Malcki et al. | 398/183 |
| 7,127,145 B2 | 10/2006 | Kamiyama et al. | 385/129 |
| 7,182,877 B2 | 2/2007 | Murai et al. | 216/24 |
| 7,190,872 B2 | 3/2007 | Kamiyama et al. | 385/129 |
| 7,239,442 B2 | 7/2007 | Kourogi et al. | 359/346 |
| 7,260,279 B2 * | 8/2007 | Gunn et al. | 385/2 |
| 7,301,972 B2 | 11/2007 | Loewen et al. | 372/18 |
| 7,315,697 B2 | 1/2008 | Smilanski et al. | 398/201 |
| 2001/0055327 A1 | 12/2001 | Kaneko et al. | 372/70 |
| 2002/0196509 A1 | 12/2002 | Smilanski et al. | 359/188 |
| 2003/0072335 A1 | 4/2003 | Momiuchi et al. | 372/21 |
| 2003/0219046 A1 | 11/2003 | Kitaoka et al. | 372/32 |
| 2004/0017833 A1 | 1/2004 | Cundiff et al. | 372/18 |
| 2004/0182817 A1 | 9/2004 | Murai et al. | 216/23 |
| 2004/0218880 A1 | 11/2004 | Matsko et al. | 385/122 |
| 2004/0233950 A1 | 11/2004 | Furukawa et al. | 372/43 |
| 2004/0240781 A1 | 12/2004 | Savchenkov et al. | 385/27 |
| 2005/0074200 A1 | 4/2005 | Savchenkov et al. | 385/15 |
| 2005/0123306 A1 | 6/2005 | Ilchenko et al. | 398/161 |
| 2005/0128566 A1 | 6/2005 | Savchenkov et al. | 359/321 |
| 2005/0195879 A1 | 9/2005 | Ishizu | 372/66 |
| 2005/0254534 A1 | 11/2005 | Loewen et al. | 372/32 |

FOREIGN PATENT DOCUMENTS

| | | |
|---|---|---|
| JP | 7-159820 | 6/1995 |
| JP | 8-166610 | 6/1996 |
| JP | 11-183858 | 7/1999 |
| JP | 2002-156669 | 5/2002 |
| JP | 2003-228033 | 8/2003 |

* cited by examiner

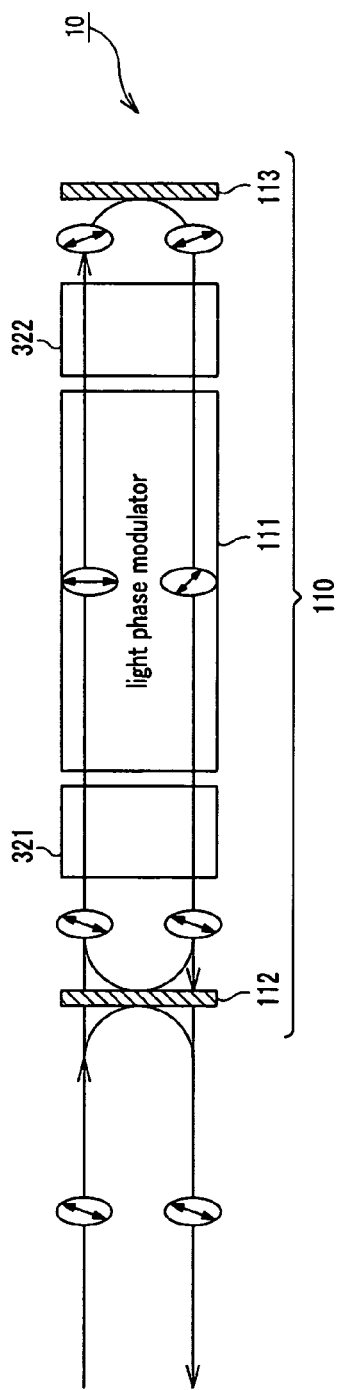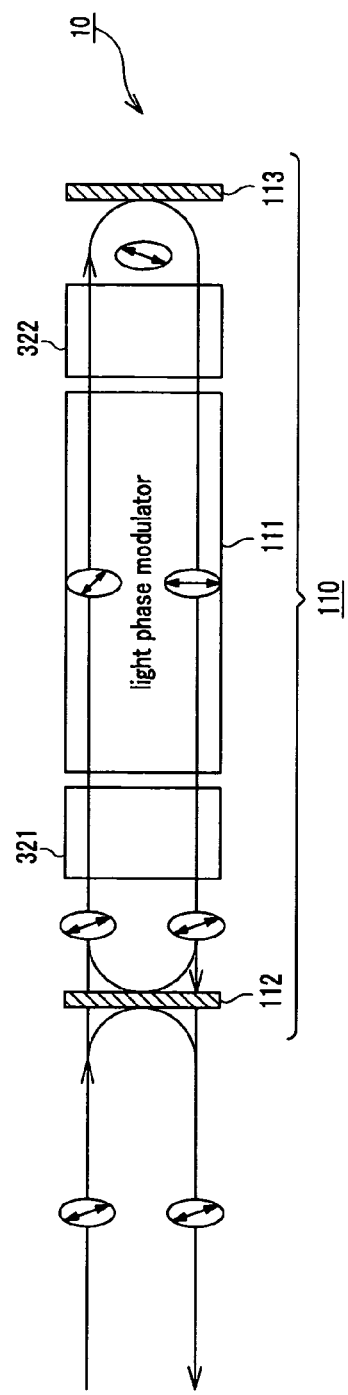

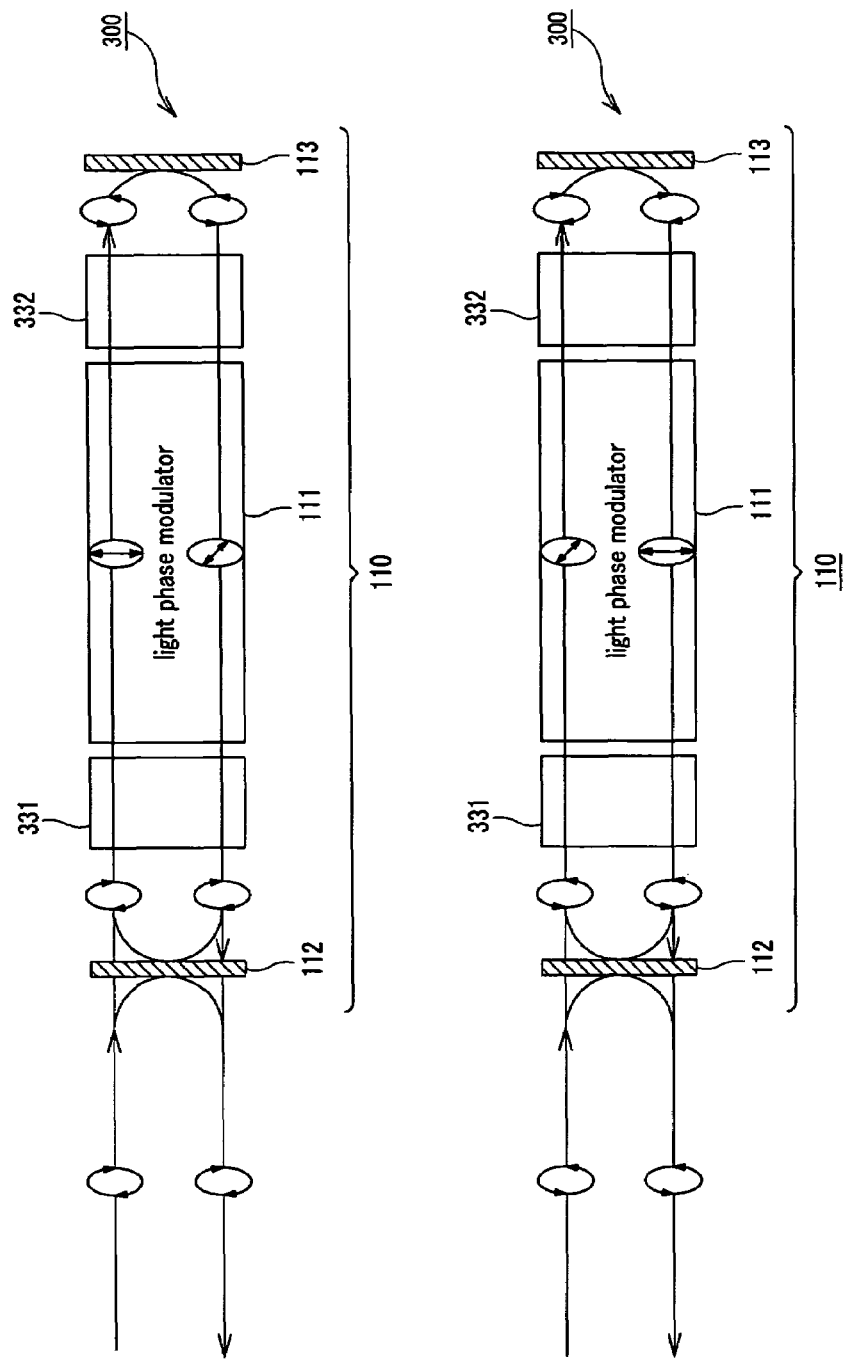

OPTICAL FREQUENCY COMB GENERATOR AND OPTICAL MODULATOR

TECHNICAL FIELD

This invention relates to an optical frequency comb generator and an optical modulator. The optical frequency comb generator and the optical modulator according to the present invention find application in any fields of use in need of a multi-wavelength highly coherent reference light source or a light source that may take advantage of coherence between different wavelengths, such as in the field of optical communication, optical CT or optical frequency references.

This application claims priority based on Japanese Patent Applications Nos. 2003-385449 and 2003-385450 filed in Japan on Nov. 14, 2003. These patent applications are to be incorporated by reference to form part of the present application.

BACKGROUND ART

For measuring the frequency of light to high accuracy, the light being measured is caused to interfere with other light, and an electrical signal of the optical beat frequency generated is measured, by way of performing heterodyning detection. The frequency band of light that may be measured by this heterodyning detection is limited by the frequency band of a light receiving device as used in the detection system, and is on the order of tens of GHz.

On the other hand, for keeping pace with the recent development in opto-electronics, the frequency band of light that may be measured needs to be increased further in order to carry out light control for frequency multiplexed communication or in order to measure the frequency of absorption rays distributed over a wide range.

For meeting the demand for increasing the frequency band that may be measured, a broadband heterodyning detection system, exploiting an optical frequency comb generator, such as is disclosed in Japanese Laid-Open Patent Publication 2003-202609, has been proposed. This optical frequency comb generator generates a number of comb-like sidebands, spaced apart at equal intervals on the frequency axis. The frequency stability of the sidebands is approximately equal to that of the incident light. These sidebands are subjected to heterodyning detection with the light under measurement to construct a broadband heterodyning detection system extending over a range of several THz.

FIG. 1 shows the principle of the configuration of a conventional optical frequency comb generator 3.

This optical frequency comb generator 3 uses an optical resonator 100 including an optical phase modulator 31 and reflective mirrors 32, 33 arranged facing each other with the optical phase modulator 31 in-between.

With this optical resonator 100, light Lin incident via reflective mirror 32 with a small transmittance is caused to be resonant between the reflective mirrors 32, 33 and part of light Lout is radiated via reflective mirror 33. An optical phase modulator 31 is formed by an electro-optical crystal for optical phase modulation, the refractive index of which is changed by application of an electrical field. The light passing through the optical resonator 100 is subjected to phase modulation by an electrical signal of a frequency $f_m$ applied to the electrode 36.

In this optical frequency comb generator 3, an electrical signal, synchronized with the time of reciprocation of light through the optical resonator 100, is input from the electrode 36 to the optical phase modulator 31. By so doing, it is possible to apply phase modulation deeper by tens of times than in case the signals traverse the optical phase modulator 31 only once. It is possible to generate hundreds of higher order sidebands, with the frequency intervals $f_m$ between neighboring sidebands all being equal to the frequency $f_m$ of the input electrical signal.

The conventional optical frequency comb generator is not limited to the above-described bulk type configuration. For example, a waveguide path type optical frequency comb generator 20, employing a waveguide path, may also be used.

This waveguide path type optical frequency comb generator 20 is formed by a waveguide path type optical modulator 200. The waveguide path type optical modulator 200 is made up of a substrate 201, a waveguide path 202, an electrode 203, a light incident side reflective film 204, a light exiting side reflective film 205 and an oscillator 206.

The substrate 201 is prepared by slicing a large-sized crystal of $LiNbO_3$ or GaAs, 3 to 4 inch in diameter, grown by, for example Czochralski method, in the form of a wafer.

A waveguide path 202 is provided for propagating light thereon. The refractive index of the layer, which forms the waveguide path 202, is set so as to be higher than that of the other layers, such as substrate layer. The light incident on the waveguide path 202 is propagated as it undergoes total reflection on the boundary surface of the waveguide path 202.

The electrode 203, formed of a metal material, such as Al, Cu, Pt or Au, applies an electrical signal of a frequency $f_m$, supplied from outside, to the waveguide path 202. The direction of propagation of light through the waveguide path is equal to the proceeding direction of the modulating electrical field.

The light incident side reflecting film 204 and the light exiting reflecting film 205 are provided for causing resonance of light incident on the waveguide path 202. The incident light is set in the resonant state by light bouncing back and forth through the waveguide path 202. An oscillator 206 is connected to the electrode 203 to supply the electrical signal with a frequency $f_m$.

The light incident side reflecting film 204 is arranged on the light incident side of the waveguide path type optical modulator 200. On this light incident side reflecting film falls the light of a frequency $v_1$ from a light source, not shown. This light incident side reflecting film 204 reflects light reflected by the light exiting side reflecting film 205 and which has traversed the waveguide path 202.

The light exiting side reflecting film 205 is arranged on the light exiting side of the waveguide path type optical modulator 200, and reflects the light which has traversed the waveguide path 202. The light exiting side reflecting film 205 also radiates to outside a preset portion of the light which has passed through the waveguide path 202.

In the above-described waveguide path type optical frequency comb generator 20, an electrical signal, synchronized with the time of light reciprocation in the waveguide path 202, is supplied from the electrode 203 to the waveguide path type optical modulator 200 This renders it possible to apply phase modulation deeper by tens of times than if the electrical signal is passed through the optical phase generator only once. By so doing, an optical frequency comb may be generated which has a number of sidebands extending over a wide range, as in the bulk type optical frequency comb generator. The frequency interval between neighboring sidebands unexceptionally becomes equal to the frequency $f_m$ of the input electrical signal.

DISCLOSURE OF THE INVENTION

Problems to be Solved by the Invention

However, with the above-described conventional waveguide path type optical frequency comb generator 20, phase modulation can be applied only to the portion of propagated light which is propagated within the generator in the outward path direction shown in FIG. 2, because of constraints innate to the generator structure. Thus, the conventional waveguide path type optical frequency comb generator suffers the problem that the modulation efficiency is necessarily lowered compared to a case where phase modulation is applied to both the light propagated in the outward path direction and the light propagated in the backward path direction. The phase modulation in this case is referred to below as reciprocating modulation.

On the other hand, if it is desired to realize the modulation degree equivalent to that of the reciprocating modulation, it is necessary to increase the intensity of the electrical signal supplied from the electrode 203 to the waveguide path 202. Hence, a larger voltage needs to be applied at the time of phase modulation. If the power needed is increased, the driving circuit inclusive of the electrode 203 is subjected to a larger load, thereby increasing the size of the heterodyning detection system in its entirety and raising the cost. Additionally, the increased voltage may lead to malfunctions of the waveguide path type optical frequency comb generator 20 itself.

On the other hand, the modulation efficiency of the above-described conventional waveguide path type optical frequency comb generator 20 is strongly dependent on the direction of polarization of light propagated in the waveguide path 202. Hence, the conventional waveguide path type optical frequency comb generator suffers the problem that only the light of the specified direction of polarization can be modulated.

Furthermore, a polarized light saving fiber needs to be provided for adjusting the direction of polarization of light propagated in the waveguide path 202, thus increasing the man power and cost.

In view of the above depicted problem of the prior art system, it is an object of the present invention to provide an optical frequency comb generator in which the light in a resonant state in an optical resonator is subjected to reciprocating modulation by a simplified configuration to improve the modulation efficiency without increasing the power necessary for phase modulation.

It is another object of the present invention to provide an optical resonator in which the modulation efficiency may be improved without dependency upon the directions of polarization of incident light.

For accomplishing the above objects, an optical frequency comb generator according to the present invention comprises oscillation means for oscillating a modulating signal of a preset frequency, and resonator means composed of a light incident side reflecting mirror and a light exiting side reflecting mirror, parallel to the light incident side reflecting mirror. The light incident side reflecting mirror and the light exiting side reflecting mirror are configured for propagating light incident via the light incident side reflecting mirror in the outward path direction or in the backward path direction for causing the resonant state of the incident light. The optical frequency comb generator also comprises optical modulating means arranged between the light incident side reflecting mirror and the light exiting side reflecting mirror, for phase-modulating the light, resonant in the resonator means, responsive to the modulating signal supplied from the oscillation means, for generating a plurality of sidebands spaced apart from one another by an interval corresponding to the frequency of the modulating signal, with the frequency of the incident light as center. The optical modulating means phase-modulates the light propagated in the outward path direction or the light propagated in the backward path direction.

For accomplishing the above objects, an optical modulator according to the present invention comprises separating means for separating the incident light depending on the directions of polarization, polarized light control means for matching the directions of polarization of light components, obtained on separation, and oscillation means for oscillating a modulating signal of a preset frequency. The optical modulator also comprises resonator means formed by a pair of reflective mirrors, arranged parallel to each other, for propagating light incident from the polarized light control means via one of the reflective mirrors at respective different angles in the outward path direction or in the backward path direction for causing the state of resonance. The optical modulator further comprises light modulation means for modulating the phase of light, set in the resonant state by the resonator means, depending on the modulating signal supplied from the modulating means.

With the optical frequency comb generator and the optical modulator, described above, phase modulation may be applied to both the light propagated in the outward path direction and that propagated in the backward path direction, on the waveguide path, thereby increasing the modulation efficiency.

For accomplishing the above objects, an optical modulator according to the present invention comprises separating means for separating the incident light depending on the directions of polarization, polarized light control means for controlling the directions of polarization of light components, obtained on separation, to the same direction, and oscillation means for oscillating a modulating signal of a preset frequency. The optical modulator also comprises light propagating means for propagating the light incident on one end face thereof in the outward path direction or in the backward path direction, and optical modulating means arranged between the end faces for phase-modulating the propagated light in dependence upon the modulating signal supplied from the oscillating means. The optical modulating means modulates the light propagated in the outward direction or in the backward direction.

For accomplishing the above objects, an optical modulator according to the present invention comprises separating means for separating the incident light depending on the directions of polarization, polarized light control means for controlling the direction of polarization of light components obtained on separation, to the same direction of polarization, and oscillation means for oscillating a modulating signal of a preset frequency. The optical modulator also includes resonator means made up of reflecting mirrors placed parallel to each other, and configured for propagating light incident at respective different angles from the polarization control means via one of the reflecting mirrors in the outward path direction or in the backward path direction for causing the resonant state, and light modulation means for phase-modulating the light, which is set in resonant state by the resonator means, in dependence upon the modulating signal supplied from the oscillation means.

With the optical modulator, in case the refractive index or the modulation efficiency of a material of light propagating means is strongly dependent on a particular direction of light polarization, the directions of light polarization of respective light components, separated by the light separating means depending on the directions of light polarization, may be controlled to the same direction of polarization. Thus, even if the light supplied contains one or more optional components of polarized light, the optical phase modulation may be applied to the supplied light to high efficiency without dependency upon these polarized light components.

Other objects and specified advantages of the present invention will become more apparent on reading the following explanation of preferred embodiments thereof in conjunction with the drawings.

BRIEF DESCRIPTION OF THE DRAWINGS

FIGS. 15(a) and 15(b) show a ring-shaped electro-optical modulator provided with a birefringence device within a resonator.

FIGS. 16(a) and 16(b) show a ring-shaped electro-optical modulator provided with a quarter wave plate within an optical resonator.

BEST MODE FOR CARRYING OUT THE INVENTION

Figure 1:
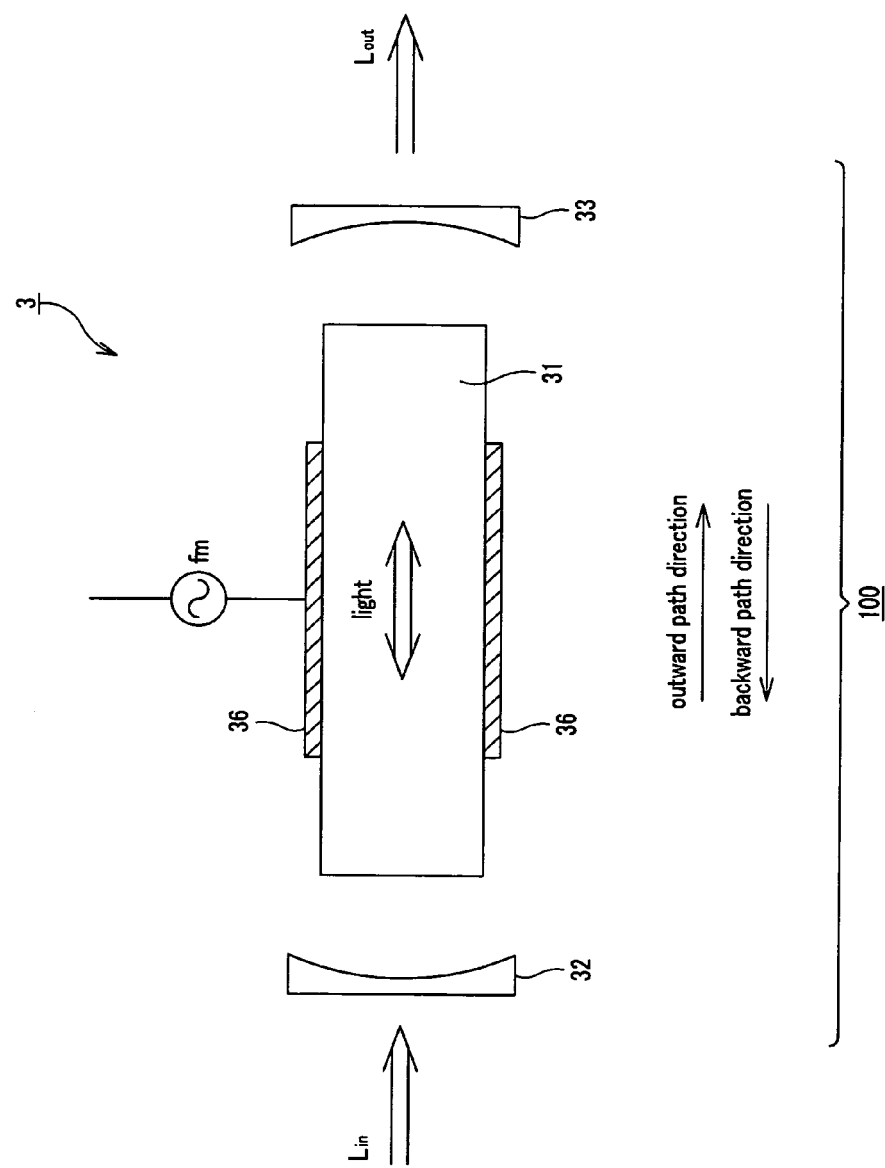
FIG. 1 is a schematic view of a structure illustrating the operating principle of a conventional optical frequency comb generator.
Figure 2:
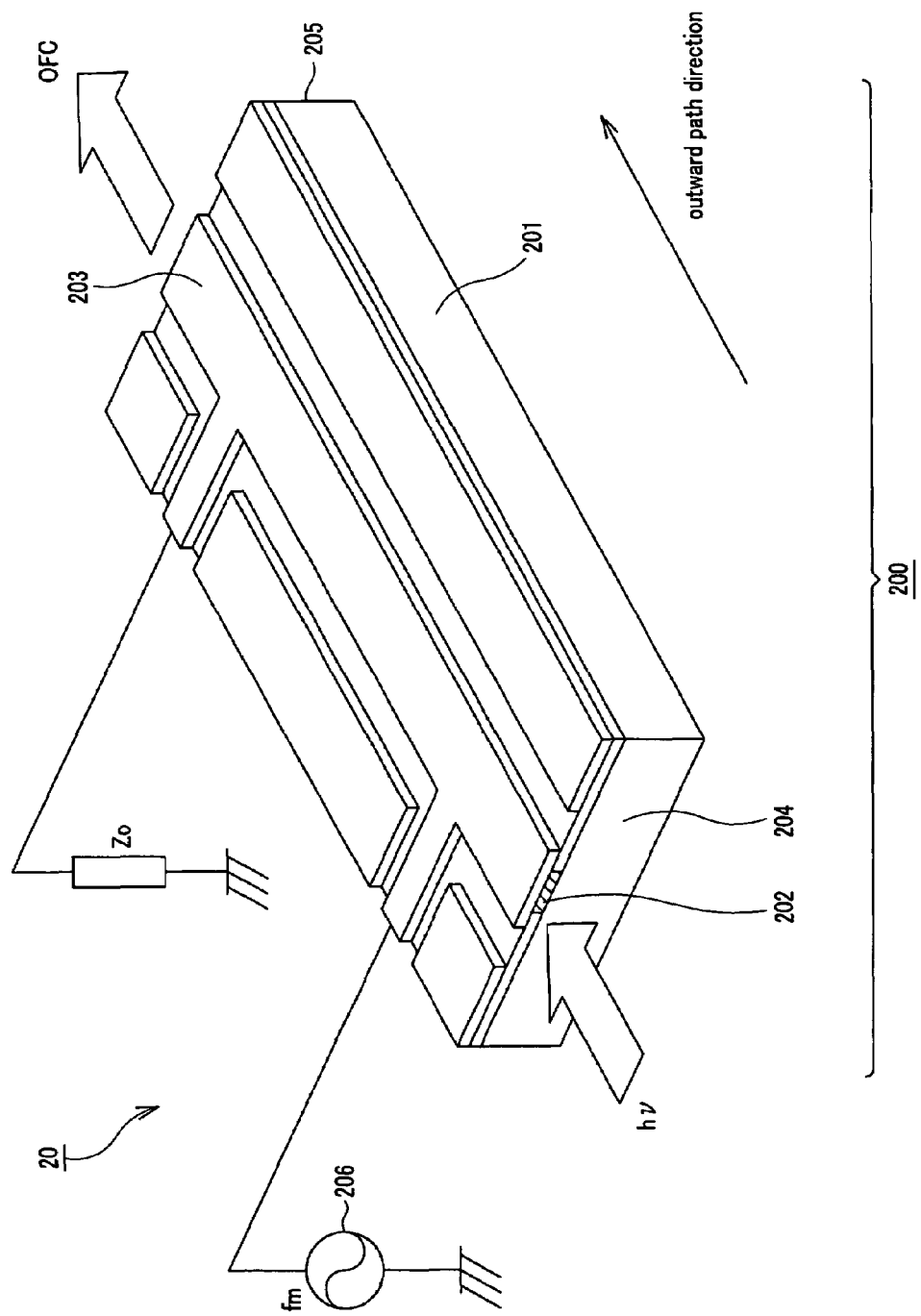
FIG. 2 is a schematic view of a structure illustrating the operating principle of a conventional waveguide type optical frequency comb generator.

Referring to the drawings, the best mode for carrying out the invention will be described in detail.

Figure 3:
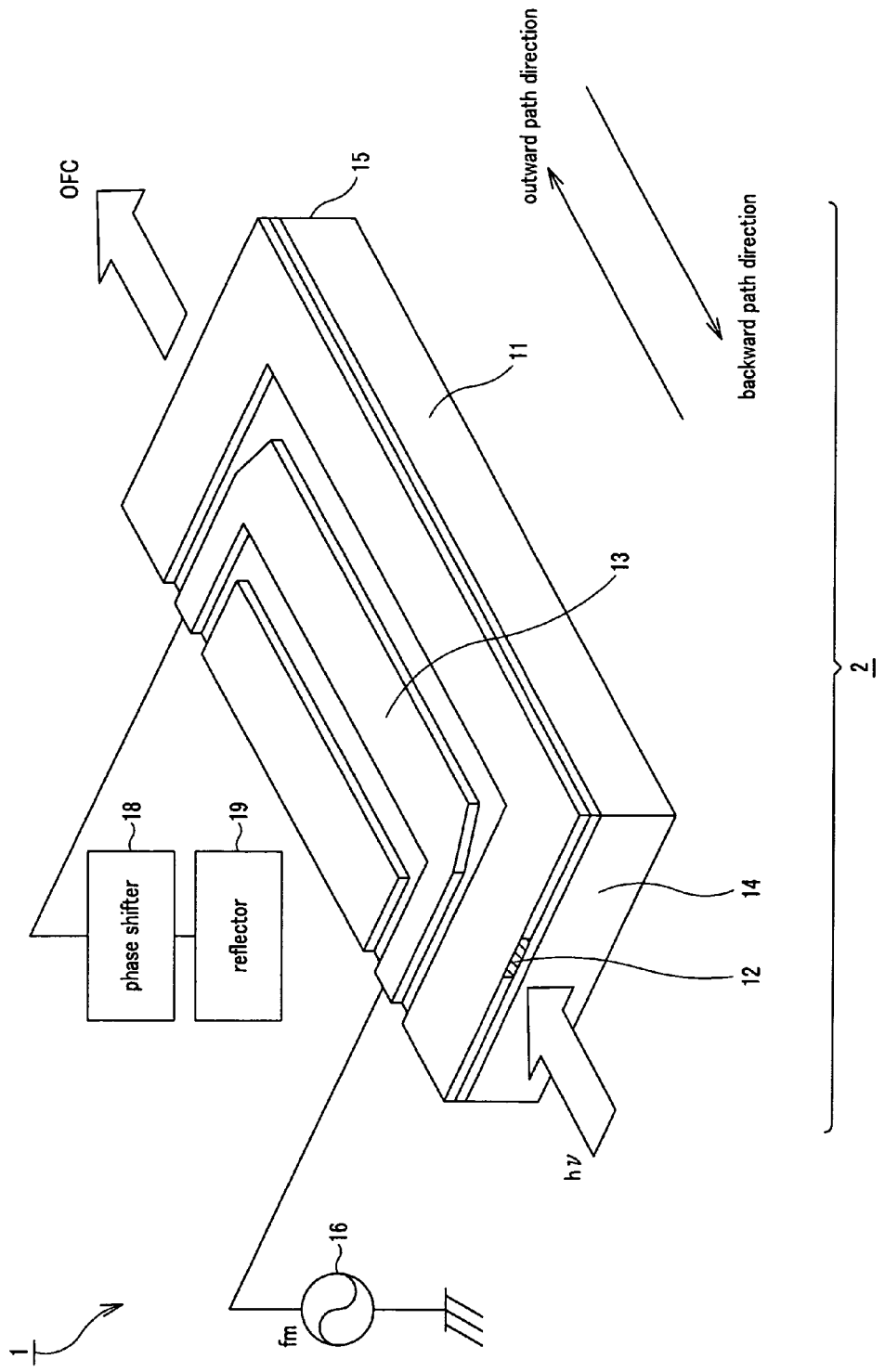
FIG. 3 is a schematic view showing the configuration of an optical frequency comb generator embodying the present invention.

FIG. 3 illustrates the configuration of an optical frequency comb generator 1 embodying the present invention. This optical frequency comb generator 1 is formed by a waveguide type optical modulator 2. The waveguide type optical modulator 2 includes a substrate 11, and a waveguide path 12, formed on the substrate 11 and adapted for modulating the phase of light being propagated. The optical frequency comb generator also includes an electrode 13, mounted on an upper surface of the substrate 11 so that the direction of a modulating electrical field is approximately orthogonal to the direction of light propagation. The optical frequency comb generator also includes a light incident side reflecting film 14 and a light exiting side reflecting film 15, provided facing each other with the waveguide path 12 in-between. The optical frequency comb generator also includes an oscillator 16, arranged on one end of the electrode 13 and adapted for oscillating a modulating signal with a frequency $f_m$. The optical frequency comb generator further includes a phase shifter 18 and a reflector 19, arranged on the opposite end of the electrode 13.

The substrate 11 is a large-sizes crystal of $LiNb_3$ or GaAs, grown by, for example, Czochralski method, and sliced as a wafer.

The waveguide path 12 is arranged for propagating light. The layer forming the waveguide path 12 has a refractive index set so as to be higher than that of other layers, such as substrate 11. The light incident on the waveguide path 12 is propagated as it undergoes total reflection on the boundary surface of the waveguide path 12. This waveguide path 12 modulates the light, passing therethrough, by exploiting physical phenomena, such as the Pockel's effect, in which the refractive index is changed in proportion to the electrical field, or the Kerr effect, in which the refractive index is changed in proportion to the square of the electrical field.

The electrode 13 is formed of a metal material, such as Ti, Pt or Au, and delivers the modulating signal, with the frequency $f_m$, supplied from outside, to the waveguide path 12. The modulating signal, with the frequency $f_m$, supplied to this electrode 13 from the oscillator 16, applies phase modulation to light propagated through the waveguide path 12.

The light incident side reflecting film 14 and the light exiting side reflecting film 15 propagate the light, incident on the waveguide path 12, in the outward path direction or in the backward path direction, indicated in FIG. 3, for causing the sate of light resonance. The light incident side reflecting film 14 is arranged on the light incident side of the waveguide path 12, so that the light supplied from outside is incident via this light incident side reflecting film 14. The light exiting side reflecting film 15 is arranged on the light exiting side of the waveguide path 12 so that the light propagated through the inside of the waveguide path 12 will be radiated to outside.

The reflector 19 reflects the modulating signal oscillated by the oscillator 16. The phase shifter 18 adjusts the phase of the reflected modulating signal.

The configuration of the electrode 13 in the optical frequency comb generator 1 according to the present invention will now be explained in further detail.

Figure 4:
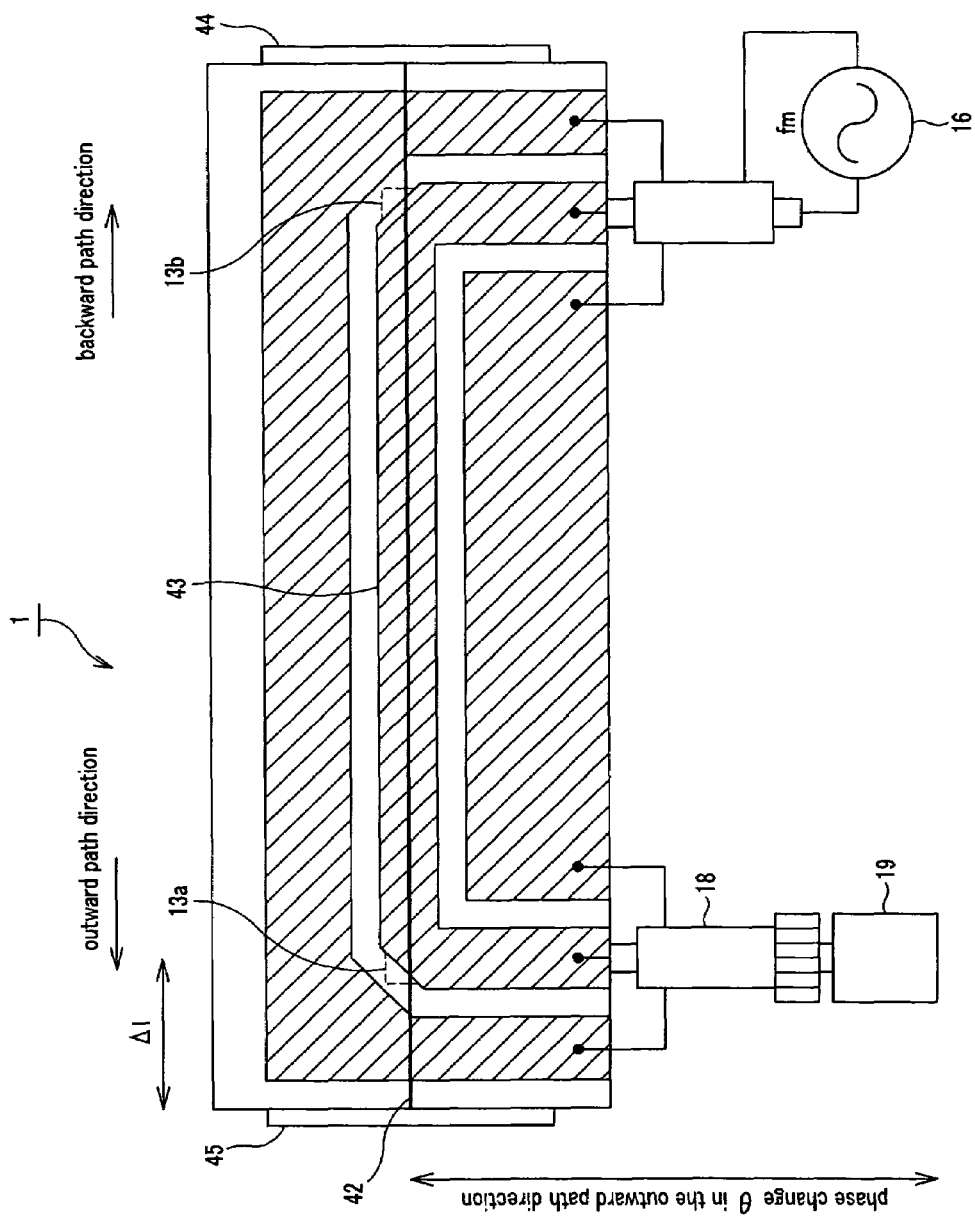
FIG. 4 illustrates the configuration of an electrode in the optical frequency comb generator embodying the present invention.

FIG. 4 depicts an upper plan view of the electrode 13. Referring to FIG. 4, the electrode 13 is formed to a U-shape from one end provided with the oscillator 16 to the opposite side provided with the phase shifter 18 and with the reflector 19. If this electrode 13 is considered to be a so-called transmission path for a high-frequency modulating signal, transmission characteristics are significantly deteriorated, by wavelength dependency of the modulating signal, in case a right-angled bend exists at a corner portion 13a or a corner portion 13b. For this reason, the corner portions 13a, 13b may be rounded to preclude the right-angled bends.

When the modulating signal, with the frequency $f_m$, generated by the oscillator 16, is supplied to the electrode 13, the modulating signal is propagated through the electrode 13 in an outward path direction to phase-modulate the light propagated in the outward path direction in the waveguide path 12. The modulating signal propagated in the outward path direction on the electrode 13 is directly reflected by the reflector 19 and phase-adjusted by the phase shifter 18 so as to be then propagated in the backward path direction through the electrode 13. This phase-modulates the light propagated in the backward path direction in the waveguide path 12. Meanwhile, the phase modulation applied to the light propagated in the backward path direction through the waveguide path 12 may be such as will produce the same phase adjustment as the phase modulation applied to the light propagated in the outward path direction.

That is, with the optical frequency comb 1, according to the present invention, phase modulation may be applied not only to the light propagated in the outward path direction through the waveguide path 12, but also to the light propagated in the backward path direction, thereby improving the modulation efficiency.

Moreover, in the above-described optical frequency comb generator 1, in which the electrical signal, synchronized with the timing of reciprocation of light through the waveguide path 12, is transmitted from the electrode 13, it is possible to apply phase modulation deeper by tens of times that applied in case the electrical signal traverses the waveguide path 12 only once. By so doing, it is possible to generate a frequency comb having sidebands extending over a broad frequency range. The frequency intervals between neighboring sidebands are all equal to the frequency $f_m$ of the input electrical signal.

Additionally, with the optical frequency comb generator 1, light may be modulated as it is confined in the narrow waveguide path 12, and hence the modulation index may be higher. It is therefore possible to increase the number of sidebands generated or the volume of light in the sidebands compared to those possible with the bulk type optical frequency comb generator.

Meanwhile, with the phase shifter 18, used in the optical frequency comb generator 1, embodying the present invention, the phase of the modulating signal, reflected by the reflector 19, may be adjusted as hereinafter described.

Referring to FIG. 4, if the length from the corner portion 13a of the electrode 13 as far as the light exiting side reflecting film 15 is $\Delta l$, and the group refractive index in the waveguide path 12 is $n_g$, the time t which elapses since light is propagated from the corner portion 13a along the waveguide path 12 and reflected by the light radiating side reflecting film 15 to return to the corner portion 13a may be expressed by the following equation (1):

$$t=2n_g\Delta l/c, \text{ c being the velocity of light} \qquad (1).$$

If, with the modulating frequency $\omega_m$, the phase shifter 18 is adjusted so that the following equation (2):

$$\omega_m t+\theta=2m\pi, \text{ where } m=0, 1, 2, \qquad (2)$$

is satisfied, for thereby changing $\theta$, the phase of the modulating signal propagated in the backward path direction is coincident with that of the light propagated in the backward path direction in the waveguide path 12. That is, the phase shifter 18 adjusts the phase of the modulating signal so that the following equation (3):

$$\theta=2m\pi-2n_g k_0\Delta l, \text{ where } k_0=\omega_m/c \qquad (3)$$

will be satisfied.

Thus, by adjusting the phase of the modulating signal, adjusted by the phase shifter 18, depending on the shape of the electrode 13, the frequency $f_m$ of the modulating signal, and on the group refractive index $n_g$ of the waveguide path 12, it is possible to match the phase of the modulating signal to the phase of light to high accuracy.

Thus, with the optical frequency comb generator 1, not only the light propagated through the waveguide path 12 in the outward path direction but also that propagated in the backward path direction may be subjected to phase modulation at a high efficiency, so that the modulation efficiency may be increased by a factor of two at the maximum. Additionally, the modulation efficiency may be effectively improved without raising the voltage applied to the electrode 13, so that power consumption may be reduced. The heterodyning detection system, provided to the optical frequency comb generator 1, may be of a slim size, thereby appreciably reducing the production cost.

The optical frequency comb generator 1, according to the present invention, is not limited to the above-described embodiment. For example, an optical frequency comb generator 7, having an L-shaped electrode, shown in FIG. 5, may also be used. In this optical frequency comb generator 7, the same parts or components as those used in the optical frequency comb generator 1 are depicted by the same reference numerals and the description is dispensed with.

Figure 5:
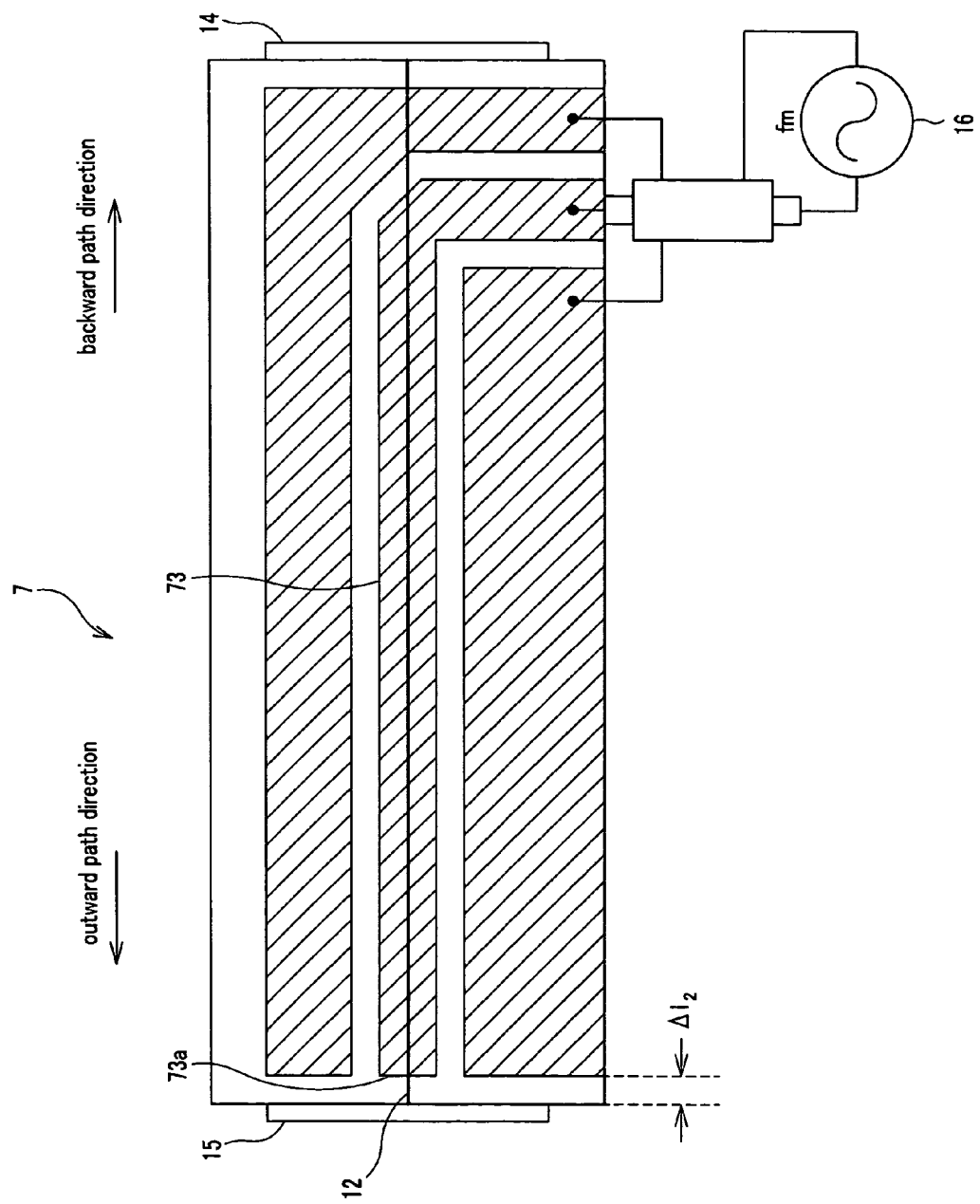
FIG. 5 illustrates the configuration of an optical frequency comb generator having an L-shaped electrode.

Referring to the top plan view of FIG. 5, the optical frequency comb generator 7 includes an electrode 73, a light incident side reflecting film 14, a light exiting side reflecting film 15, and an oscillator 16, provided on one end of the electrode 73 and adapted for oscillating the modulating signal of the frequency $f_m$. The electrode 73 is provided on an upper surface of the waveguide path 12 so that the direction of the direction of the modulating electrical field will be approximately orthogonal to the direction of light propagation. The light incident side reflecting film 14 and the light exiting side reflecting film 15 are mounted facing each other on both sides of the waveguide path 12.

The electrode 73 has a cut point 73a for reflecting the modulating signal supplied from its opposite end. Meanwhile, the electrode 73 may be provided with a shorting point, in place of the cut point 73a, adapted for reflecting the modulating signal supplied from the opposite end. Such shorting point is similarly able to reflect the modulating signal supplied from the opposite end of the electrode.

When the modulating signal of the frequency $f_m$, oscillated by the oscillator 16, is supplied to the electrode 73 of the above shape, the modulating signal is propagated on the electrode 73 in the outward path direction, thereby modulating the phase of light propagated in the waveguide path 12 on the electrode 73. The modulating signal, propagated on the electrode 73 in the outward path direction, is reflected by the cut point 73a and propagated in the backward path direction. In this manner, the light propagated within the waveguide path 12 in the backward path direction may be phase-modulated, so that the modulation efficiency may be improved, as in the case of the optical frequency comb generator 1. In particular, this optical frequency comb generator 7 is convenient in that neither the phase shifter nor the reflector 19 needs to be provided and hence it is possible to suppress losses in the modulating signal.

Meanwhile, the position of the cut point 73a may be adjusted as hereinafter explained.

In FIG. 5, with a length $\Delta l_2$ from the cut point 73a of the electrode 73 to the light exiting side reflecting film 15 and with the group refractive index $n_g$ in the waveguide path 12, the time $t_2$ which elapses since light is propagated from the cut point 73a along the waveguide path 12 and reflected back from the light exiting side reflecting film 15 to return to the corner portion 73a may be expressed by the following equation (4):

$$t_2 = 2n_g \Delta l_2/c, \text{ where } c \text{ denotes the velocity of light} \quad (4).$$

If, with the modulating frequency $\omega_m$, the following equation 5A:

$$\omega_m t_2 = 2m\pi (m=0, 1, 2, \ldots) \quad (5A)$$

is met, the light propagated in the backward path direction is modulated with the same phase as that for the outward path direction.

If, in this case, the modulating frequency $\omega_m = 2\pi f_m$, the length $\Delta l_2$ is adjusted to satisfy the following equation 6A:

$$\Delta l_2 = m\pi/n_g k_0, \text{ where } k_0 = \omega_m/c \quad (6A).$$

Meanwhile, in case the shorting point is provided to the electrode 73, in place of the cut point 73a, for reflecting the modulating signal supplied from the opposite end, with the modulating frequency being $\omega_m$, the light propagated in the backward path direction is modulated with the same phase as that for the outward path direction, provided that the following equation 5B:

$$\omega_m t_2 = (2m+1)\pi (m=0, 1, 2, \ldots) \quad (5B)$$

is met.

If, in this case, the modulating frequency $\omega_m = 2\pi f_m$, the length $\Delta l_2$ is adjusted so that the following equation 6B:

$$\Delta l_2 = (2m+1)\pi/2n_g k_0, \text{ where } k_0 = \omega_m/c \quad (6B)$$

is met.

Thus, by adjusting the cut point 73a of the electrode 73 depending on the frequency of the modulating frequency and the group refractive index of the waveguide path 12, it is possible to apply high efficiently phase modulation.

Figure 6:
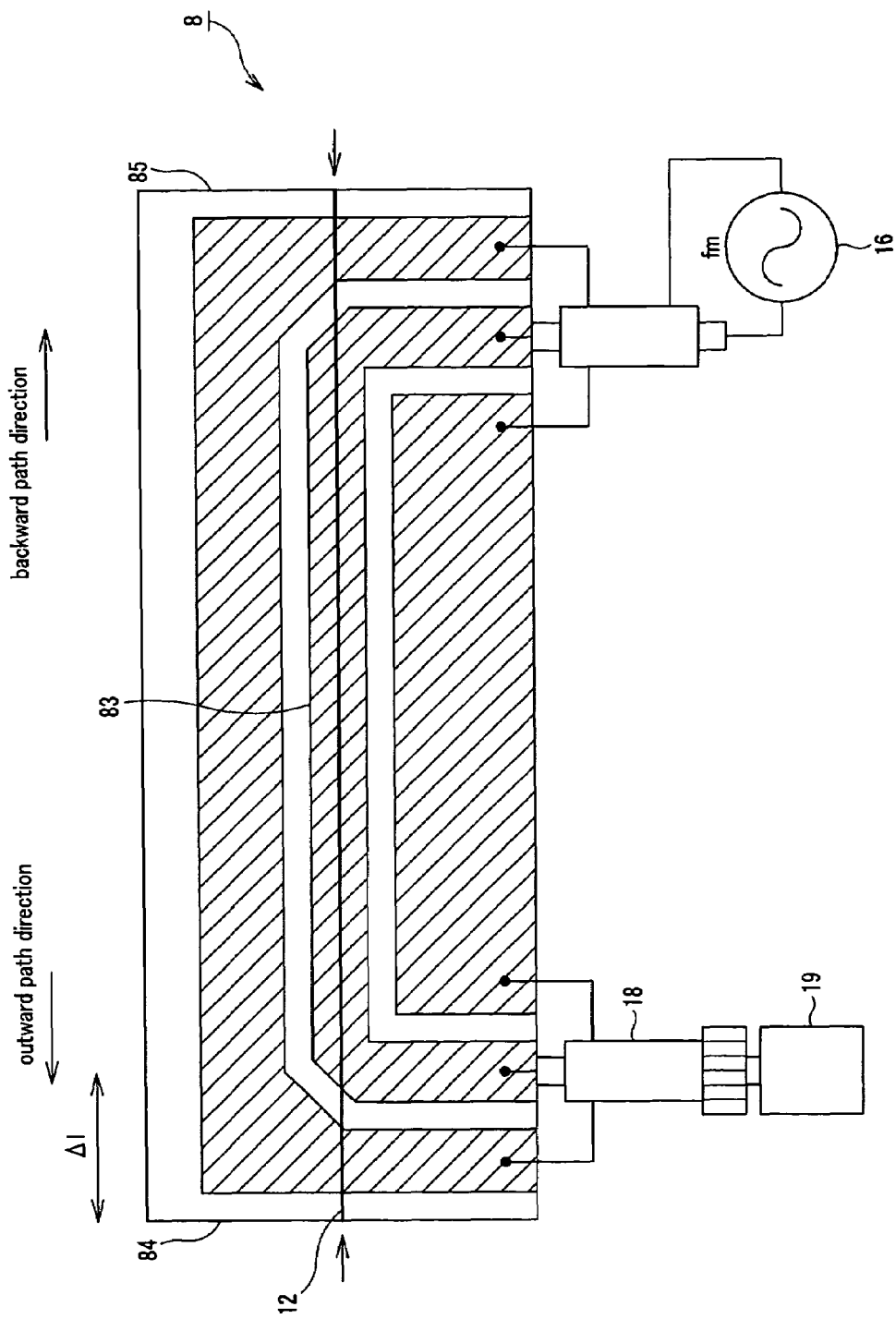
FIG. 6 illustrates an optical frequency comb generator capable of efficiently modulating the phase of light propagated, irrespective of on which of the end faces light is incident.

The present invention may also be applied to an optical modulator 8, as shown in FIG. 6. With this optical modulator 8, it does not matter from which one of end faces 84, 85 light is caused to be incident on the optical modulator. The incident light beams are propagated in the waveguide path 12 in the outward direction path or in the backward direction path, as they are modulated in the manner as described above, to exit to outside via opposite end faces 85, 84. Hence, with this optical modulator 8, it is possible to efficiently modulate not only the phase but also the intensity or polarized waves of propagated light without dependency on the end face on which falls the light.

It is noted that the optical modulator 8 is not limited to the above-described embodiment, so that it is possible to apply directly the configuration of the optical frequency comb generator 7, having an L-shaped electrode, as the optical modulator.

Figure 7:
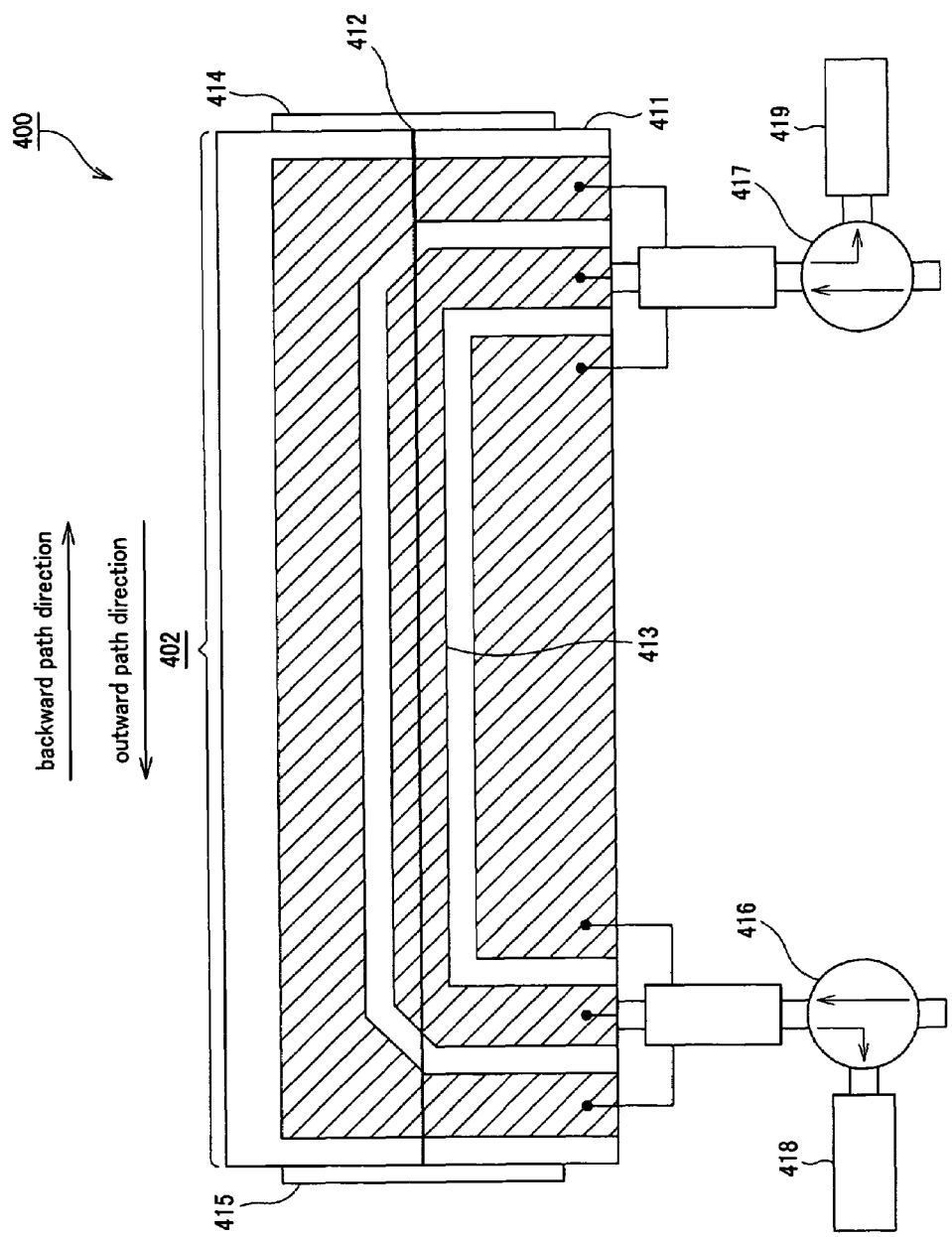
FIG. 7 illustrates the configuration of an optical frequency comb generator capable of generating an optical comb by modulating plural reciprocally different modulating signals by a sole optical modulator.

Moreover, the optical frequency comb generator 1, embodying the present invention, is not limited to the above-described embodiment. For example, an optical frequency comb generator 400, adapted for generating an optical comb by modulating plural different modulating signals on a sole optical modulator, as shown in FIG. 7, may also be used.

This optical frequency comb generator 400 is formed by a waveguide type optical modulator 402. The waveguide type optical modulator 402 includes a substrate 411, a waveguide path 412, formed on the substrate 411 and adapted for phase-modulating propagated light, and an electrode 413 provided on the upper surface of the waveguide path 412 so that the direction of the modulating electrical field will be substantially orthogonal to the direction of light propagation. The waveguide type optical modulator 402 also includes a light incident side reflecting film 414 and a light exiting side reflecting film 415, mounted facing each other with the waveguide path 412 in-between. The waveguide type optical modulator 402 also includes a first circulator 416, arranged on one end side of the electrode 413 and supplied with a modulating signal with a frequency $f_{m1}$, and a second circulator 417, arranged on one end side of the electrode 413 and supplied with a modulating signal with a frequency $f_{m2}$. The waveguide type optical modulator 402 further includes a first non-reflecting terminator 418, connected to the first circulator 416, and a second non-reflecting terminator 419, connected to the second circulator 417.

Since the constitution of the substrate 411, waveguide path 412 and the electrode 413 are of the same constitution as the substrate 11, waveguide path 12 and the electrode 13, reference is made to the explanation for these components and detailed description here is dispensed with.

The light incident side reflecting film 414 and the light exiting side reflecting film 415 may be of the same constitution as the aforementioned light incident side reflecting film 14 and the light exiting side reflecting film 15, respectively. The light incident side reflecting film 414 and the light exiting side reflecting film 415 may also be formed by end faces carrying e.g. reflecting films of low reflectance. These films may also be formed by crystal end faces not carrying films of high reflectance, or may be provided with a non-reflective coating for decreasing the reflectance of crystal end faces. That is to say, it is not mandatory that the light incident side reflecting film 414 and the light exiting side reflecting film 415 shall be formed as films of high reflectance.

The modulating signal, with a frequency $f_{m1}$, supplied to the first circulator 416, proceeds rectilinearly through the first circulator 416 so as to be propagated in the backward path direction on the electrode 413. The signal is then changed in its direction of propagation by the second circulator 417 so as to be absorbed by the second non-reflecting terminator 419. On the other hand, the modulating signal with a frequency $f_{m2}$, supplied to the second circulator 417, proceeds rectilinearly through the second circulator 417 so as to be propagated in the outward path direction on the electrode 413. The signal is then changed in its direction of propagation by the first circulator 416 so as to be absorbed by the first non-reflecting terminator 418.

That is, with the electrode 413 of this optical frequency comb generator 400, the modulating signal with the frequency $f_{m1}$ may be propagated only in the backward path direction, whilst the modulating signal with the frequency $fm_2$ may be propagated only in the outward path direction. Hence, the light propagated only in the backward direction through the waveguide 402, arranged parallel to the electrode 413, may be modulated with the frequency $f_{m1}$, whilst the light propagated only in the outward direction may be modulated with the frequency $f_{m2}$, thereby allowing efficient generation of the optical frequency comb.

It is noted that the frequencies $f_{m1}$ and $f_{m2}$ of the modulating signals, supplied to the first and second circulators 416, 417, may be the same frequency. Moreover, the modulating signals do not have to be generated by separate sources and may be generated by separating modulating signals supplied from one and the same signal source.

In the present embodiment, the optical frequency comb generator 400, generating the optical frequency comb, has been taken as an example for explanation. However, the present invention is not to be limited to this embodiment and may, of course, be applied to the waveguide type optical modulator 402 which only modulates the light propagated in the waveguide path 412.

The present invention is also applicable to a modulation system 9 which is not dependent on light polarization.

Figure 8:
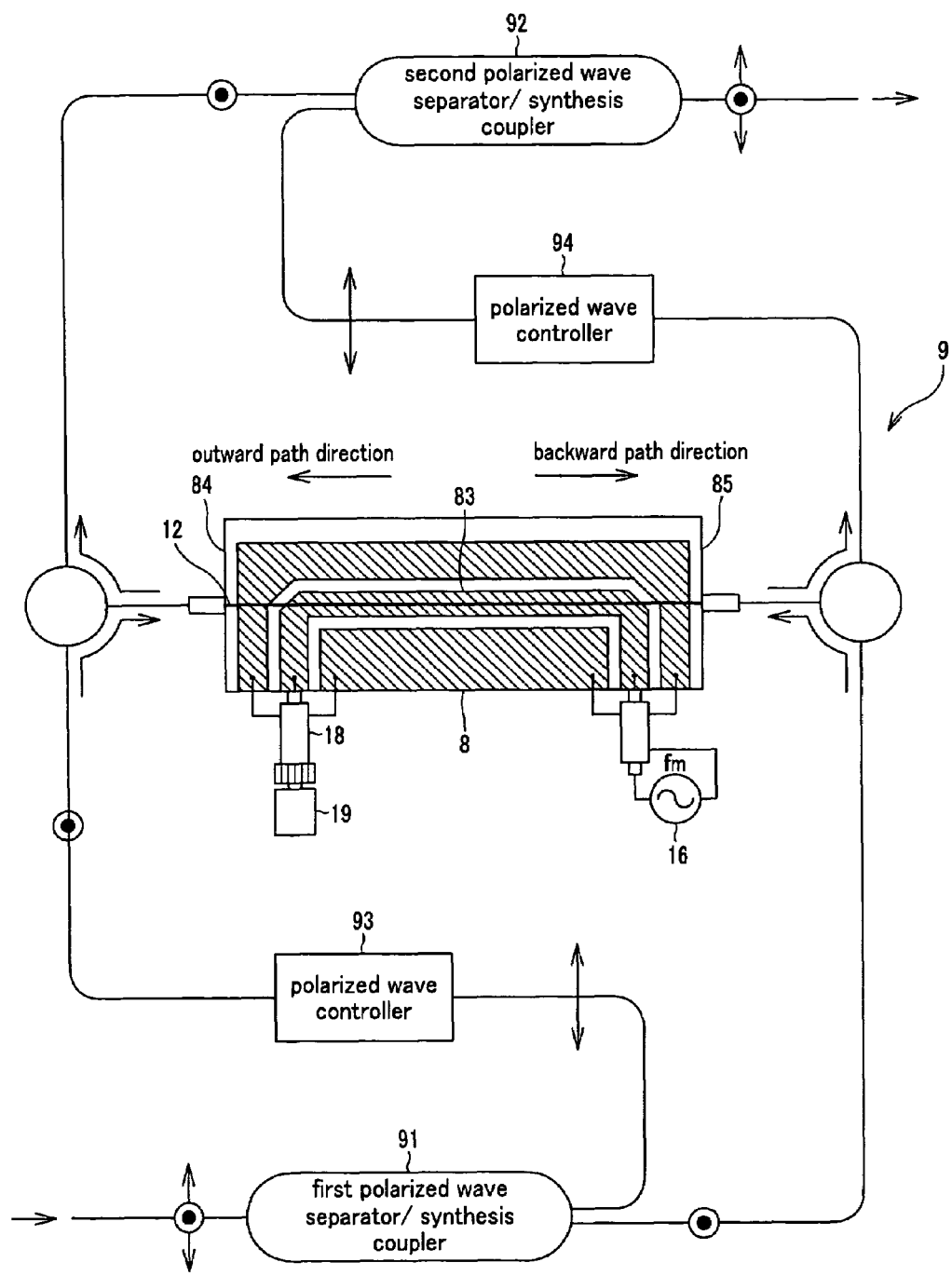
FIG. 8 is a schematic view for illustrating a modulation system not dependent on a polarized wave.

Referring to FIG. 8, this modulation system includes an optical modulator 8, a first polarized wave separator/synthesis coupler 91, a first polarized wave controller 93, a second polarized wave controller 94 and a second polarized wave separator/synthesis coupler 92. The first polarized wave separator/synthesis coupler separates the light supplied to the optical modulator 8 into plural polarized light components. The first polarized wave controller 93 controls the rotation of the direction of polarization of a polarized light component separated by the first polarized wave separator/synthesis coupler 91. The second polarized wave controller controls the direction of light polarization of a polarized light component radiated from the optical modulator 8. The second polarized wave separator/synthesis coupler synthesizes the light radiated from the second polarized wave controller 94 and the optical modulator 8 to output the so synthesized light to outside.

The first polarized wave separator/synthesis coupler 91 separates the horizontally polarized light and the vertically polarized light from the light supplied from outside. The light containing the horizontally polarized light component is supplied to the first polarized wave controller 93, whilst the light containing the vertically polarized light component is directly supplied to the optical modulator 8.

The first polarized wave controller 93 rotates the polarized light component from the horizontal direction to the vertical direction to route the so rotated light component to the optical modulator 8. This equalizes the direction of polarization of propagated light, so that, in case the refractive index of the material of the waveguide path 12 or the modulation efficiency shows strong dependency on a particular direction of light polarization, it is possible to control the directions of polarization of different light beams to the same direction of polarization which is the particular direction of light polarization.

The second polarized wave controller 94 rotates the direction of polarization of the light component radiated from the optical modulator 8 from the vertical direction to the horizontal direction and routes the light to the second polarized wave separator/synthesis coupler 92. This second polarized wave separator/synthesis coupler 92 synthesizes the light containing the component of horizontally polarized light with the light containing the vertically polarized light component, radiated from the opposite end of the optical modulator 8, to radiate the resulting synthesized light to outside.

In FIG. 8, the directions of light polarization of the respective polarized light components are indicated by symbols shown in the following Table 1:

TABLE 1

| polarized light components | ↕ horizontal direction |
|---|---|
|  | ⊙ vertical direction |

Figure 9:
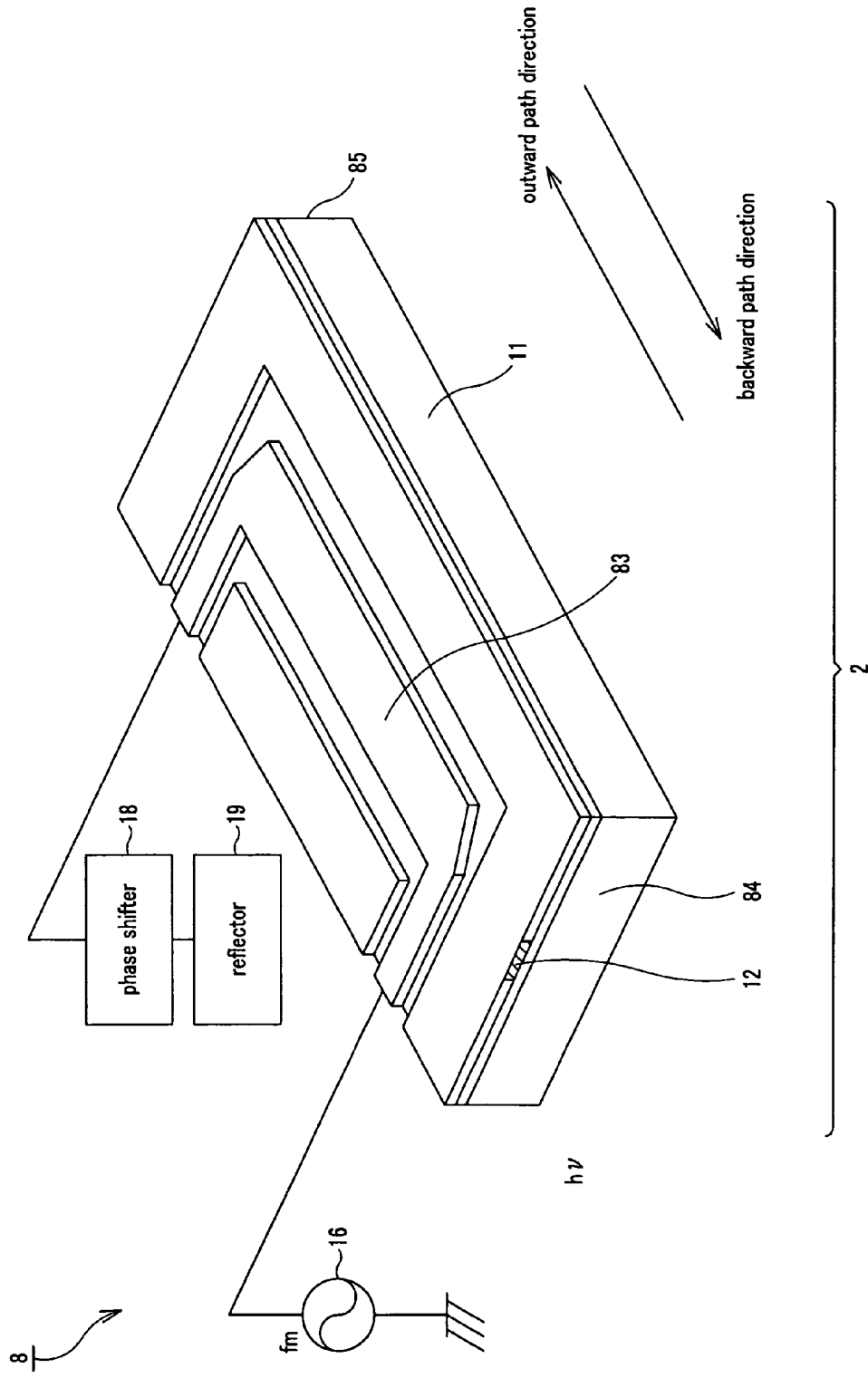
FIG. 9 is a schematic view showing an optical frequency comb generator in the above modulation system.

Referring to FIGS. 8 and 9, the optical modulator 8 includes a substrate 11, and a waveguide path 12, formed on the substrate 11 for phase-modulating the propagated light. The optical modulator also includes an electrode 83 provided on the upper surface of the waveguide path 12 so that the direction of the modulating electrical field will be approximately orthogonal to the direction of light propagation. The optical modulator also includes a first end face 84 and a second end face 85, mounted facing each other with the waveguide path 12 in-between. The optical modulator also includes an oscillator 16, arranged on one end of the electrode 83, for oscillating a modulating signal with a frequency $f_m$. The optical modulator further includes a phase shifter 18 and a reflector 19, both provided on the opposite side of the electrode 83.

The substrate 11 is obtained by slicing a large-sized crystal, such as $LiNbO_3$ or GaAs crystal, grown by, for example, Czochralski method, in the form of a wafer.

The waveguide path 12 is arranged for propagating the light. The refractivity index of the layer of the waveguide path 12 is set so as to be higher than that of the other layers, such as the substrate layer. The light incident on the waveguide path 12 is propagated as it undergoes total reflection on the boundary surface of the waveguide path 12. This waveguide path 12 modulates the light passing thereon by taking advantage of the Pockel's effect in which the refractive index is changed in proportion to the electrical field, or the Kerr's effect, in which the refractive index is changed in proportion to the square of the electrical field.

The electrode 83 is formed of, for example, Ti, Pt or Au, and delivers the modulating signal, with the frequency $f_m$, supplied from outside to the waveguide path 12. The modulating signal, with the frequency $f_m$, supplied from the oscillator 16 to the electrode 83, applies phase modulation to light propagated through the waveguide path 12.

The first end face 84 and the second end face 85 operate to cause the light, incident on the waveguide path 12, to be propagated in the outward path direction or in the backward path direction, shown in FIG. 9, to cause resonance.

The reflector 19 reflects the modulating signal, oscillated by the oscillator 16. The phase shifter 18 adjusts the phase of the reflected modulating signals.

The light incident via the first end face 84 is propagated in the backward path direction through the waveguide path 12 so as to be radiated via second end face 85. The light incident via the second end face 84 is propagated in the outward path direction through the waveguide path 12 so as to be radiated via first end face 85. That is, with the present optical modulator 8, light may be incident on whichever one of the end faces 84, 85, and light incident is propagated in the outward path direction or in the backward path direction in the waveguide path 12, as it is modulated, as described above. The propagated light is radiated to outside via opposite end faces 84, 85. Thus, with the present optical modulator 8, the light propagated may be efficiently modulated without dependency on which one of the end faces the light has been incident.

In the above-described embodiment, the case of modulating the phase of light has been described. However, the present invention is not limited to this case, such that, for example, the intensity of light or the polarized wave may be modulated by taking advantage of all sorts of the electro-optical effects. The present invention is also applicable to a Mach-Zender type optical modulator.

The present optical modulator 8 may also be applied to a ring-shaped electro-optical modulator 80, as now explained.

Figure 10:
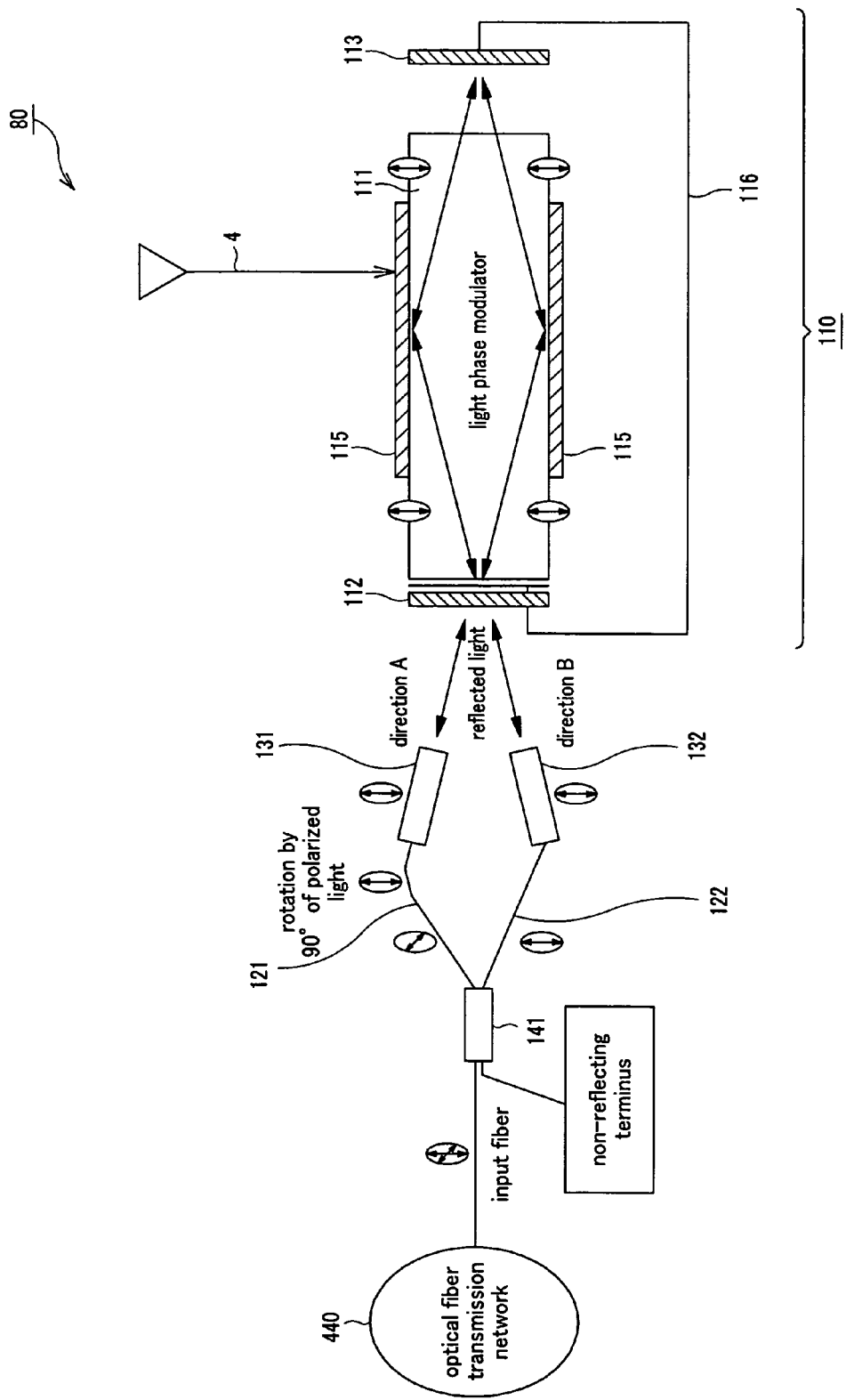
FIG. 10 shows a configuration of a ring-shaped electro-optical modulator.

Referring to FIG. 10, this ring-shaped electro-optical modulator 80 includes an optical phase modulator 111, and an optical resonator 110, made up of a first mirror 112 and a second mirror 113, mounted facing each other with interposition of the optical phase modulator 111. The ring-shaped electro-optical modulator also includes a pair of electrodes 115, mounted on upper and lower surfaces of the optical phase modulator 111 so that the direction of the modulating electrical field will be substantially normal to the direction of light propagation. The ring-shaped electro-optical modulator also includes an enclosure for temperature compensation 116 in which are housed the above components of the electro-optical modulator. The ring-shaped electro-optical modulator also includes a first light path 121 and a second light path 122, formed by an optical fiber for propagating the light beams incident on and exiting from the first mirror 112. The ring-shaped electro-optical modulator also includes a first collimator 131, arranged at a terminal end of the first light path 121, a second collimator 132, arranged at a terminal end of the second light path 122, and a polarized wave separator/synthesis coupler 141, connected to the first and second light paths 121, 122.

The optical phase modulator 111 is an optical device for phase modulating the light beams, passing therethrough, based on an electrical signal supplied thereto. The optical phase modulator 111 may be formed of the same material as the waveguide path 12. Meanwhile, each lateral surface of the optical phase modulator 111 has reflectance controlled to cause total reflection of light incident thereon. Thus, in FIG. 10, the light beams incident from an oblique direction through the first mirror 112 on the lateral surface of the optical phase modulator 111 is totally reflected by the lateral surface, while also being reflected by the second mirror 113. Consequently, the light beams follow a substantially ring-shaped path within the optical phase modulator 111.

The first and second mirrors 112, 113 are provided for causing resonance of light beams incident on the optical resonator 110. Specifically, the light beams passing back and forth through the optical phase modulator 11 are set in a resonant state by repeated reflection therein.

The first mirror 112 is arranged on the light incident side of the optical phase modulator 111 so that light beams are incident on from the first collimator 131 or the second collimator 132. The first mirror reflects part of light reflected by the second mirror 113 and passed through the optical phase modulator 111, while transmitting part of light to outside.

The electrodes 115 are connected to an antenna 4 for transmitting/receiving wireless signals. The light beams propagated through the inside of the optical phase modulator 111 are subjected to phase modulation by the wireless signals, with the frequency $f_m$, supplied from outside to the electrodes 115.

The polarized wave separator/synthesis coupler 141 separates the light beams, transmitted from an optical fiber transmission network 440, into horizontally polarized light beams and vertically polarized light beams. Or, the polarized wave separator/synthesis coupler 141 synthesizes the horizontally polarized light beams and the vertically polarized light beams. The light beams obtained on separation and containing horizontally polarized light beams are propagated on the first light path 121, whilst the light beams obtained on separation and containing vertically polarized light beams are propagated on the second light path 122.

The first light path 121, formed by an optical fiber, mounted on rotation, causes rotation of the polarized component of light beams from the horizontal direction to the vertical direction. This equalizes the direction of polarization of light beams propagated on the first light path 121 and that of light beams propagated on the second light path 122. Meanwhile, the second light path 122 may be provided with the function of causing rotation of the direction of polarization.

The first collimator 131 and the second collimator 132 collimate the light beams propagated on the first light path 121 and those propagated on the second light path 122 to radiate the so collimated light beams to the first mirror 112 of the optical resonator 110.

In the ring-shaped electro-optical modulator 80, the light beams propagated from the optical fiber transmission network 440 are initially incident on the polarized wave separator/synthesis coupler 141. Even if the incident light beams contain a variety of polarized light components, these components are separated, depending on the directions of linear polarization, and the so separated components are propagated on the first and second light paths 121, 122. The light beams, thus separated and propagated, are rotationally controlled concerning the directions of polarization, and subsequently radiated through the first and second collimators 131, 132 as collimated light beams. The light beams, thus radiated, are passed through the first mirror 112 from the directions A and B and propagated as they are totally reflected by the lateral surfaces of the optical phase modulator 111. The light beams reflected by the second mirror 113 are returned to the first mirror 112 where the light beams are partially reflected and partially transmitted so as to be then radiated outward through the first mirror 112.

That is, the light beams incident from the direction A are propagated through the inside of the optical phase modulator 111 to describe a ring-like path counterclockwise so as to be radiated in the direction B through the first mirror 112. The light beams radiated in the direction B are propagated on the second light path through the second collimator 132 and returned to the polarized wave separator/synthesis coupler 141. In similar manner, the light beams incident from the direction B are propagated along a ring-like path clockwise so as to be radiated in the direction A through the first mirror 112. The light beams radiated in the direction A are propagated on the second path through the second collimator 132 and returned to the polarized wave separator/synthesis coupler 141. The two light beams, thus returned to the polarized wave separator/synthesis coupler 141, are synthesized together and re-transmitted to the optical fiber transmission network 440.

FIG. 10 shows polarized light components of the respective directions of polarization by symbols indicated in the following Table 2:

TABLE 2

| explanation on polarized light | | |
|---|---|---|
| optional polarized light | vertically polarized light | horizontally polarized light |
| ⊕ | ⓘ | ⊖ |

In the above-described ring-shaped electro-optical modulator 80, in case the refractive index or the modulation efficiency of the material that makes up the optical phase modulator 111 shows strong dependency on a particular direction of light polarization, the directions of polarization of respective light beams, separated by the polarized wave separator/synthesis coupler 141, may be controlled to the same direction, depending on the particular direction of polarization. Hence, no matter what polarized components are contained in the supplied light, the phase modulation may be achieved to high efficiency irrespective of the polarized components.

Moreover, even if the optical fiber provided to the optical fiber transmission network 440 is not the polarized light holding fiber, high efficiency phase modulation mat be applied under controlling the direction of polarization. If this ring-shaped electro-optical modulator 80 is used as an optical modulator 81 loaded on a base station 12, it is possible to improve the universal utility of the entire system.

Meanwhile, the material or the structure of the enclosure for temperature compensation 116 of the ring-shaped electro-optical modulator 80 may be selected such as to compensate for changes in the rate of thermal expansion or in the thermal refractive index of the crystal making up the optical phase modulator 111. By so doing, it is possible to achieve high precision modulation in a manner free from the influence of the temperature environment of the base station 12.

This optical modulator 8 may also be applied to a ring-shaped electro-optical modulator 89 as now explained.

Figure 11:
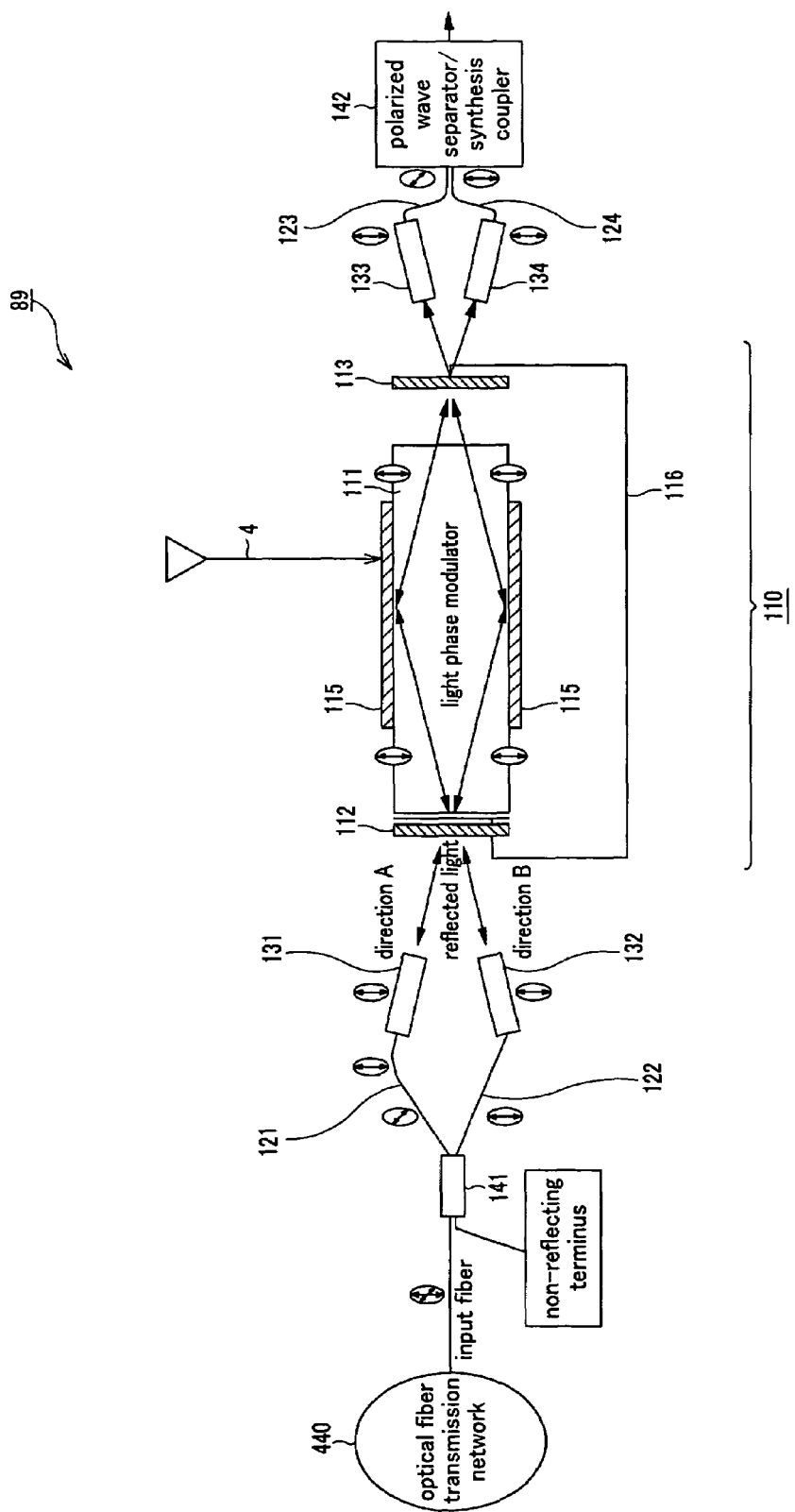
FIG. 11 shows another configuration of a ring-shaped electro-optical modulator.

Referring to FIG. 11, the ring-shaped electro-optical modulator 89 includes an optical phase modulator 111, and an optical resonator 110, made up of a first mirror 112 and a second mirror 113. The first and second mirrors 112, 113 are arranged facing each other with the optical phase modulator 111 in-between. The ring-shaped electro-optical modulator 89 also includes a pair of electrodes 115 formed on the upper and lower surfaces of the optical phase modulator 111 so that the direction of the modulating electrical field will be substantially orthogonal to the direction of light propagation. The ring-shaped electro-optical modulator also includes an enclosure for temperature compensation 116 in which are housed these components. The ring-shaped electro-optical modulator also includes a first light path 121 and a second light path 122, each formed by an optical fiber for propagating the light beams incident on the first mirror 112. The ring-shaped electro-optical modulator also includes a first collimator 131, arranged at a terminal end of the first light path 121, a second collimator 132, arranged at a terminal end of the second light path 122, and a polarized wave separator/synthesis coupler 141, connected to the first and second light paths 121, 122. The ring-shaped electro-optical modulator also includes a third light path 123 and a fourth light path 124, each formed by an optical fiber for propagating the light radiated from the second mirror 113. The ring-shaped electro-optical modulator also includes a third collimator 133, arranged at a terminal end of the third light path 123, and a fourth collimator 134, arranged at a terminal end of the fourth light path 124. The ring-shaped electro-optical modulator further includes a polarized wave separator/synthesis coupler 142, connected to the third light path 123 and the fourth light path 124.

In the ring-shaped electro-optical modulator 89, shown in FIG. 11, the same parts or components as those of the ring-shaped electro-optical modulator 80 are depicted by the same reference numerals and detailed explanation is dispensed with.

In FIG. 11, the polarized light components of the respective directions of light polarization are indicated by symbols shown in the following Table 3:

TABLE 3

| explanation on polarized light | | |
| --- | --- | --- |
| optional polarized light | vertically polarized light | horizontally polarized light |
| ⊕ | ⓛ | ⊖ |

The polarized wave separator/synthesis coupler 142 synthesizes the light beams propagated on the third and fourth light paths 123, 124.

In the third light path 123, the optical fiber is mounted with rotation for rotating the polarized light component from the horizontal direction to the vertical direction. By so doing, the direction of polarization of the light propagated on the third light path 123 becomes orthogonal to that of the propagated on the fourth light path 124. Meanwhile, the fourth light path 124 may be provided with the function of causing rotation of the direction of light polarization. An isolator may be provided for the first and second light paths 121, 122, as necessary.

The third collimator 133 and the fourth collimator 134 operate to couple the light, radiated from the second mirror 113, to the optical fibers making up the third light path 123 and the fourth light path 124, respectively.

Figure 12:
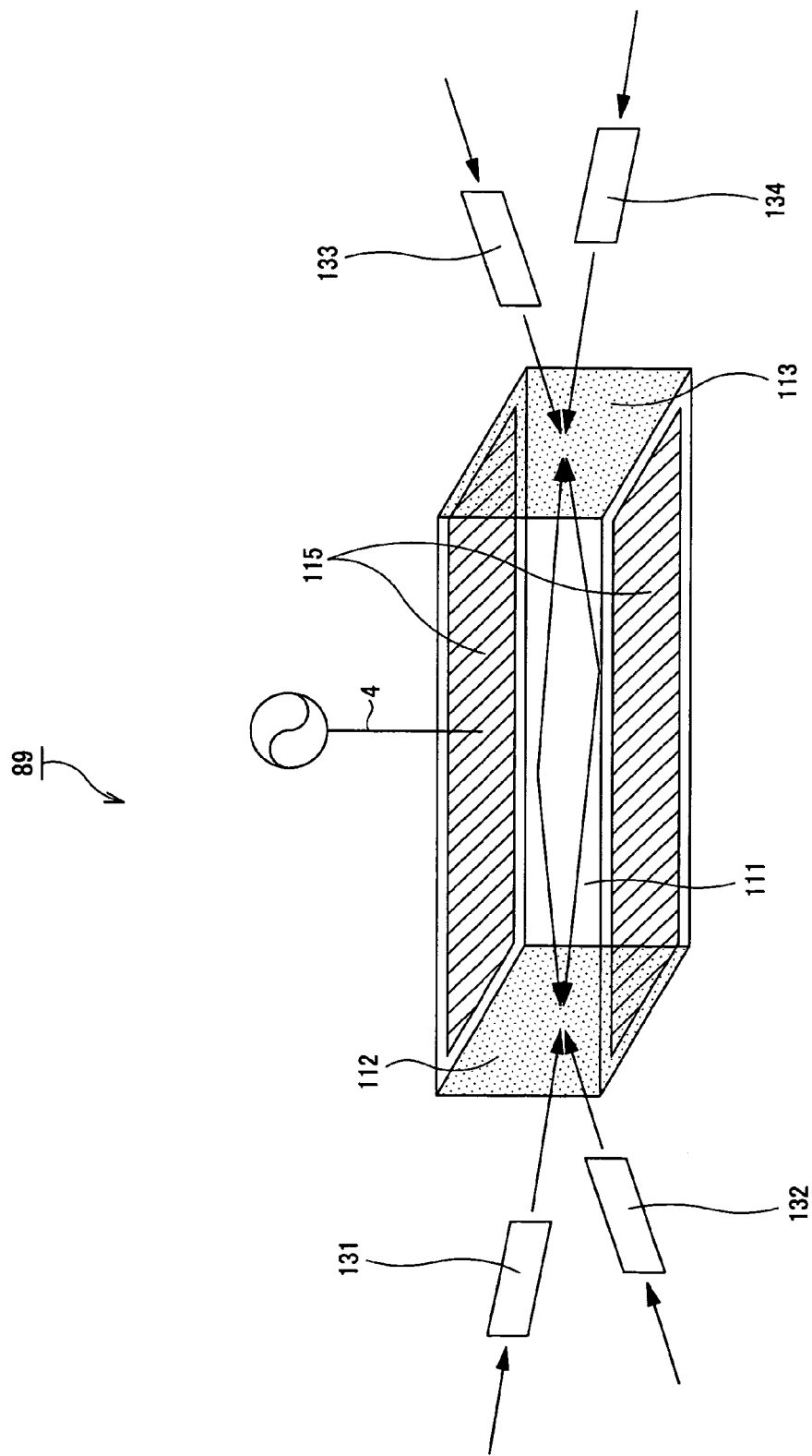
FIG. 12 is a perspective view showing a ring-shaped electro-optical modulator.

FIG. 12 depicts a perspective view of this ring-shaped electro-optical modulator 89. Although the first mirror 112 and the second mirror 113 may directly be mounted to the end face of the optical phase modulator 111, as shown in FIG. 12, they may also be externally mounted mirrors. The lateral sides of the crystal, forming the optical phase modulator 111, are total reflecting surfaces, and the light, passing back and forth through the crystal, is modulated by the upper and lower electrodes 15. If the set of the first and third collimators 131, 133 or the set of the second and fourth collimators 132, 134 is dismounted, the resulting system acts as a routine optical frequency comb generator.

It is noted that, in the ring-shaped electro-optical modulator 89, the light may not necessarily be reflected by the electrodes 115, provided on the upper and lower sides of the optical phase modulator 111, to travel along a ring-like path, as shown in FIGS. 10 and 11. That is, the light incident at optional different angles from the horizontal direction may be reflected by the transverse lateral sides, as shown in FIG. 12. When the ring-shaped electro-optical modulator 89 is used as a communication device, the configuration of FIG. 12 may be said to be more customary and hence more desirable from the perspective of practical utility.

In this ring-shaped electro-optical modulator 89, the light propagated from the optical fiber transmission network 440 initially falls on the polarized wave separator/synthesis coupler 141. Even if the incident light contains a variety of polarized light components, they are separated from one another, depending on the directions of the linear polarized light beams, so as to be propagated on the first and second light paths 121, 122. The light beams, obtained on separation, have their directions of light polarization rotationally controlled and are radiated as collimated light beams through the first and second collimators 131, 132. The so collimated light beams are passed in this state through the first mirror 112 from the directions A and B and propagated as they are totally reflected by the lateral sides of the optical phase modulator 111. The light radiated from the second mirror 113 is radiated via third and fourth collimators 133, 134 on the third and fourth light paths 123, 124, respectively. The light propagated on the third light path 123 has its direction of polarization adjusted and gets in this state to the polarized wave separator/synthesis coupler 142. The respective light beams, returned to the polarized wave separator/synthesis coupler 141, are synthesized together so as to be again transmitted to the optical fiber communication network 440.

Figure 13:
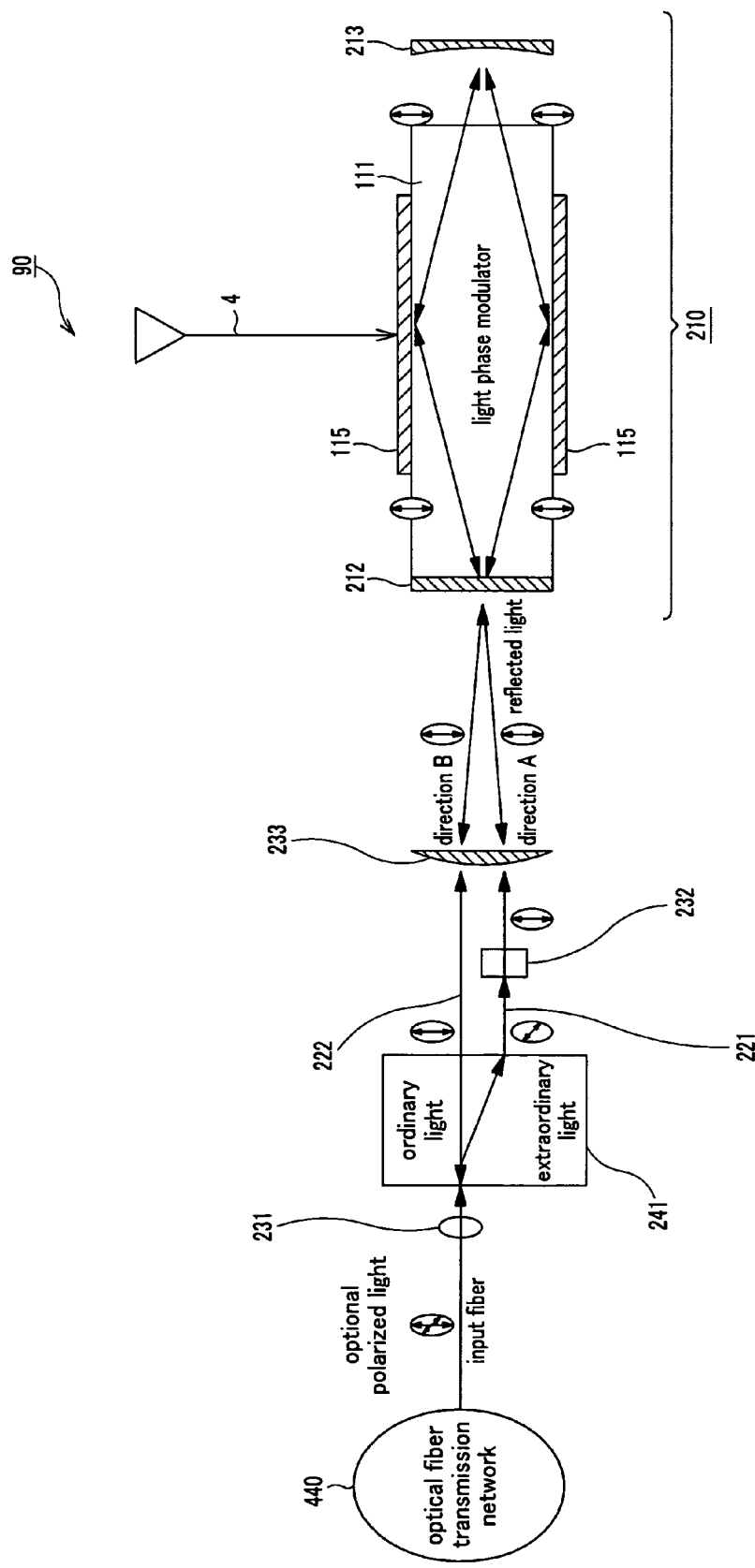
FIG. 13 shows a further configuration of a ring-shaped electro-optical modulator.

Meanwhile, the ring-shaped electro-optical modulator 80, embodying the present invention, is not limited to the above-described configuration, and a ring-shaped electro-optical modulator 90, separating the light into respective polarized wave components, using a birefringence device, as shown in FIG. 13, may also be employed. In this ring-shaped electro-optical modulator 90, shown in FIG. 13, the same parts or components as those of the ring-shaped electro-optical modulator 80 are indicated by the same reference numerals, and the corresponding explanation is dispensed with.

This ring-shaped electro-optical modulator 90 includes an optical phase modulator 111, an optical resonator 210 and a pair of electrodes 115. The optical resonator 210 is made up of a first mirror 212 and a second mirror 213, arranged facing each other with the optical phase modulator 111 in-between. The electrodes 115 are formed on the upper and bottom surfaces of the optical phase modulator 111 so that the direction of the modulating electrical field will be approximately orthogonal to the direction of light propagation. The ring-shaped electro-optical modulator 90 also includes a collimator lens 231, a birefringence device 241, a half-wave plate 232 and a plano-convex mirror 233. The collimator lens collimates the light from the optical fiber transmission network 440, and the birefringence device separates the light, radiated from the collimator lens 231, into respective polarized light components. The half-wave plate is arranged on a light path, referred to below as a first light path 221, for the light of a polarized light component, separated by the birefringence device 241. The plano-convex mirror is placed on the above light path 221 and a light path, referred to below as a second light path 222, for the light of another polarized light component, separated on the first light path 221 by the birefringence device 241.

The first mirror 212 and the second mirror 213 are provided for causing resonance of light incident on the optical resonator 210. The resonant state of light is generated by causing reflection of light reciprocated inside the optical phase modulator 111.

The first mirror 212 is arranged on the light incident side of the optical phase modulator 111 and has light incident thereon from the plano-convex mirror 233. The second mirror 213 is formed as a concave mirror for re-collimating the light once condensed by the plano-convex mirror 233.

The birefringence device 241 separates the light, collimated by the collimator lens 231, into a horizontally polarized light component and a vertically polarized light component, based on its birefringence in which the refractive index is varied in dependence upon the direction of light polarization. The light containing the horizontally polarized light component is propagated on the first light path 221, whilst the light containing the vertically polarized light component is propagated on the second light path 222.

The half-wave plate 232 is arranged on the first light path 221 so that its optical axis is inclined 45° relative to the direction of light polarization to enable the polarized light component to be rotated from the horizontal direction to the vertical direction to equate the direction of light polarization of light propagated on the first light path 221 to that of light propagated on the second light path 222. There may be provided means for rotating the direction of light polarization on the second light path 222.

With the above-described ring-shaped electro-optical modulator 90, the light propagated from the optical fiber transmission network 440 falls on the birefringence device 241 through the collimator lens 231. Even if this incident light contains a variety of polarized light components, it is separated into light on the first light path 221 and that on the second light path 222, in dependence upon the directions of polarization of the linear polarized light components. Of these, the light component on the first light path 221 is passed through the half-wave plate 232, and has its direction of light polarization rotationally controlled so as to be condensed by the plano-convex mirror 233, along with the light component on the second light path 222. The two light components are then incident from different directions (directions A and B) on the optical phase modulator 111.

The light component, incident from the direction A, is propagated through the optical phase modulator 111 along a ring-shaped path clockwise as shown in FIG. 13 so as to be radiated in the direction B via first mirror 212 The light component then traverses the plano-convex mirror 233 to return to the birefringence device 241. In similar manner, the light component, incident from the direction B, is propagated along a ring-shaped path counterclockwise so as to be radiated in the direction A via first mirror 212. The light component then traverses the plano-convex mirror 233 to return to the birefringence device 241.

In FIG. 13, the directions of light polarization of the respective polarized light components are indicated by symbols shown in the following Table 4:

TABLE 4

| explanation on polarized light | | |
| --- | --- | --- |
| optional polarized light | vertically polarized light | horizontally polarized light |
| ⊕ | ⓪ | ⊖ |

With this ring-shaped electro-optical modulator 90, phase modulation may be achieved to high efficiency no matter which polarized light components are contained in the light propagated on the optical fiber communication network 440.

With this ring-shaped electro-optical modulator 90, relevant components may be assembled in the enclosure for temperature compensation 116 described above.

Figure 14:
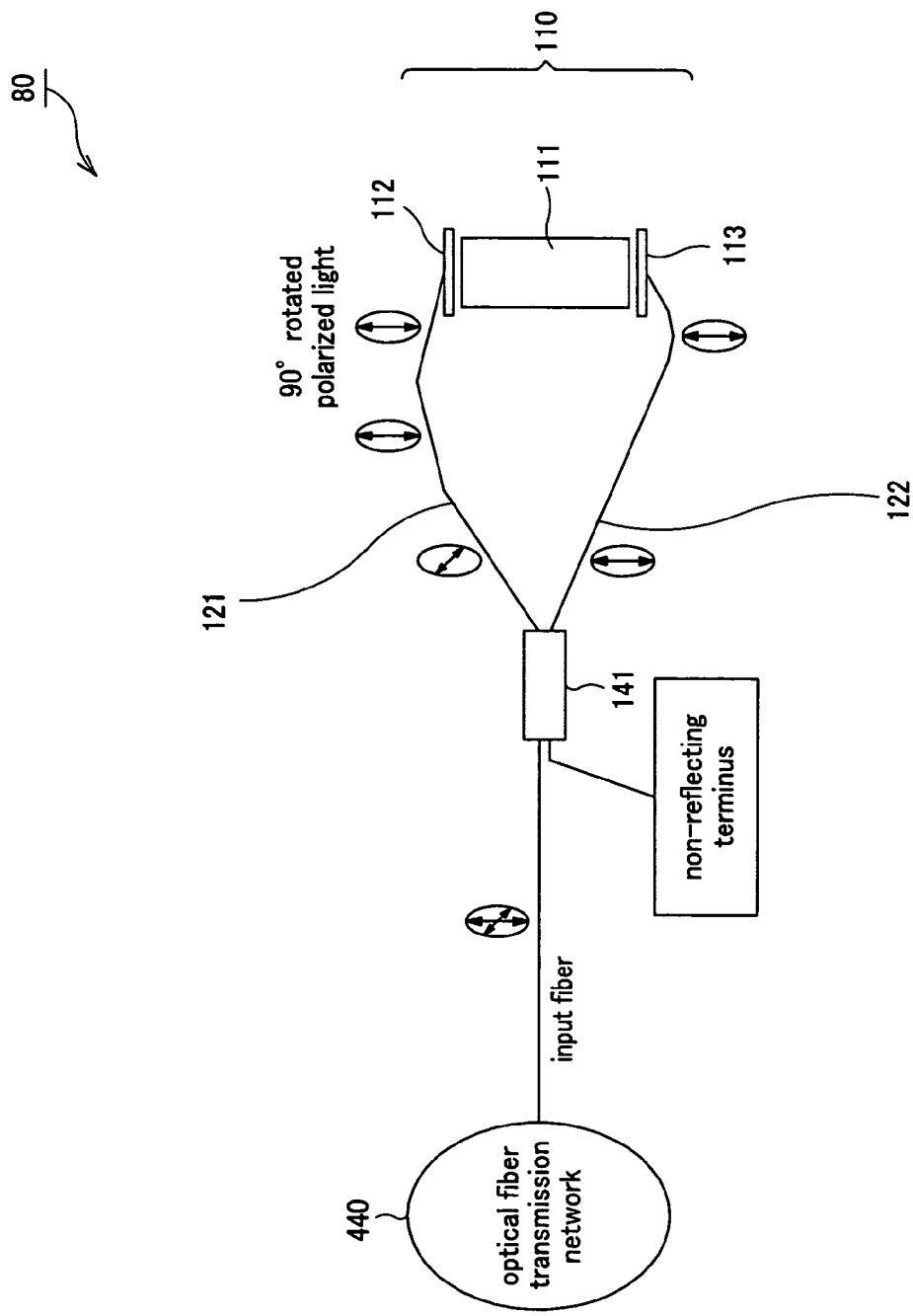
FIG. 14 shows a configuration of a ring-shaped electro-optical modulator which realizes inputting and outputting of laser light over different light paths.

Additionally, with the ring-shaped electro-optical modulator 80, embodying the present invention, the optical phase modulator 111 may be provided in the configuration shown in FIG. 14.

The configuration of FIG. 14 has a looped configuration from the first light path 121 through the optical resonator 110 and the optical phase modulator 111 to the second light path 122. Thus, the first mirror 112 is arranged near the terminal end of the first light path 121, while the second mirror 113 is arranged near the terminal end of the second light path 122.

The light obtained on separation by the polarized wave separator/synthesis coupler 141, and containing the horizontally polarized light component, is propagated on the first light path 121, so as to be incident via first mirror 112 on the optical phase modulator 111, where the light is modulated. The so modulated light is returned via second light path 122 to the polarized wave separator/synthesis coupler 141. The light obtained on separation by the polarized component saving coupler 141, and containing the vertically polarized light component, is propagated on the second light path 122, so as to be incident via second mirror 113 on the optical phase modulator 111, where the light is modulated. The so modulated light is returned via first light path 121 to the polarized component saving coupler 141. The length of the first light path 121 is selected to be equal to that of the second light path 122 so that the light components returned from the first light path 121 and the second light path 122 to the polarized light saving coupler 141 will be synchronized to each other and summed together in the so synchronized state.

That is, in the configuration shown in FIG. 14, light input/output for the optical phase modulator 111 may be implemented over different light paths 121, 122. With this configuration, the same phase modulation may be achieved on interchanging the light paths 121, 122 concerning the use thereof as the input or the output.

In FIG. 14, the directions of light polarization of the respective polarized light components are indicated by symbols shown in the following Table 5:

TABLE 5

| explanation on polarized light | | |
|---|---|---|
| optional polarized light | vertically polarized light | horizontally polarized light |
| ⦶ | ⦿ | ⊗ |

The ring-shaped electro-optical modulator 80, embodying the present invention, is not limited to the configuration described above. For example, a ring-shaped electro-optical modulator 10, including Faraday rotors within a resonator, as shown in FIGS. 15(a) and 15(b), may also be used. In this ring-shaped electro-optical modulator 10, the same components as those of the above-described ring-shaped electro-optical modulator 80 are depicted by the same reference numerals, and the corresponding description is dispensed with.

The ring-shaped electro-optical modulator 10 includes an optical phase modulator 111, and an optical resonator 110, made up of a first mirror 112 and a third mirror 113, arranged facing each other with the optical phase modulator 111 in-between. The ring-shaped electro-optical modulator 10 also includes a pair of electrodes, not shown, formed on upper and lower surfaces of the optical phase modulator 111 so that the direction of the modulating electrical field will be orthogonal to the direction of light propagation. The ring-shaped electro-optical modulator 10 also includes a first Faraday rotor 321, arranged between the first mirror 112 and the optical phase modulator 111, and a second Faraday rotor 322, arranged between the second mirror 113 and the optical phase modulator 111. These Faraday rotors provide for rotation of polarized light by 45°.

On the first mirror 112 are incident any arbitrary polarized light components. The first mirror 112 partially reflects and partially transmits the incident light.

The first Faraday rotor 321 rotates the direction of light polarization of light passing through the first mirror 112 by −45° to route the resulting light to the optical phase modulator 111. The first Faraday rotor 321 rotates the direction of light polarization of light, emanating from the optical phase modulator 111, further by −45° to route the resultant light to the first mirror 112.

The second Faraday rotor 322 rotates the direction of light polarization of light passing through the optical phase modulator 111 by −45° to route the resulting light to the first mirror 113. The second Faraday rotor 322 also rotates the direction of light polarization of light emanating from the second mirror 113 by −45° to route the resultant light to the optical phase modulator 111.

That is, when supplied with the polarized light component, offset by 45° from the vertical direction, as shown in FIG. 15(a), the ring-shaped electro-optical modulator 10 causes this light to be rotated by −45° by the first Faraday rotor 321, thereby setting the direction of light polarization to the vertical direction. The polarized light component, offset by 45° from the vertical direction, is termed 45° polarized light hereinbelow. The light composed of this vertical polarized light component is directly passed through the optical phase modulator 111 and has its direction of polarization rotated by the second Faraday rotor 322 by −45° so that the light is turned into the polarized light component offset by −45° from the vertical direction. This polarized light component is termed −45° polarized light hereinbelow. This −45° polarized light is reflected by the second mirror 113 and has its direction of polarization rotated by −45° by the second Faraday rotor 322, so that the light now becomes the horizontal polarized light component. The light beam, composed of the horizontal polarized light component, is directly passed through the optical phase modulator 111 and has its direction of polarization again rotated by the first Faraday rotor 321 by −45°. The resultant 45° polarized light is radiated by the first mirror 112.

In similar manner, if the −45° polarized light is supplied to the ring-shaped electro-optical modulator 10, the polarized light is rotated by −45° by the first Faraday rotor 321 so that its direction of polarization is turned into the horizontal direction, as shown in FIG. 15(b). The light composed of the horizontal polarized light component is directly passed through the optical phase modulator 111 and has its direction of polarization rotated by −45° by the second Faraday rotor 322 to become the 45° polarized light. The 45° polarized light, thus generated, is reflected by the second mirror 113 and again has its direction of polarization rotated by −45° by the second Faraday rotor 322 to become the vertical polarized light component. The light composed of this vertical polarized light component is directly transmitted through the optical phase modulator 111 and has its direction of polarization rotated through −45° by the first Faraday rotor 321. The resulting −45° polarized light is radiated through the first mirror 112.

In FIG. 15, the directions of light polarization of the respective polarized light components are indicated by symbols shown in the following Table 6:

TABLE 6

| explanation on polarized light | | | |
|---|---|---|---|
| 45° Polarized light | −45° Polarized light | vertically polarized light | horizontally polarized light |
| ⦸ | ⦹ | ⦿ | ⊗ |

Thus, in the ring-shaped electro-optical modulator 10, in which the Faraday rotors 321, 322 are provided ahead and in rear of the optical phase modulator 111, only two polarized light components, crossing each other, may be propagated within the optical phase modulator 111. The directions of light polarization in these two polarized light components, orthogonal to each other, differ from each other in dependence upon the directions of light propagation in the ring-shaped electro-optical modulator 10. However, the routes of propagation and the optical distance of the two polarized light components remain the same. Consequently, the optical resonator 110 itself is degenerated concerning the light beams having two polarized light components crossing each other. In this case, high efficiency phase modulation may be achieved without dependency upon the direction of polarization of incident light.

The present invention is not limited to the above-described ring-shaped electro-optical modulator 10 and may also be applied to a ring-shaped electro-optical modulator 300 including a quarter wave plate within the optical resonator 110, as shown in FIGS. 16(a) and 16(b).

This ring-shaped electro-optical modulator 300 includes an optical phase modulator 111 and an optical resonator 110. The ring-shaped electro-optical modulator also includes a quarter wave plate 331, arranged between the first mirror 312 and the optical phase modulator 111, and another quarter wave plate 332, arranged between the second mirror 113 and the optical phase modulator 111.

When vertical and horizontal polarized light components are contained in the light traversing the quarter wave plates 331, 332, the phase difference equal to $\pi/2$ is applied by the quarter wave plates to the polarized light components.

That is, when the present ring-shaped electro-optical modulator 300 is supplied with circular polarized light, the vector of which is rotated clockwise, referred to below as right-circular polarized light, this polarized light is turned into vertically polarized light by the quarter wave plate 331. The light composed of this vertically polarized light component is directly passed through the optical phase modulator 111 and turned into circular polarized light, the vector of which is rotated counterclockwise, referred to below as the left-circular polarized light. The left-circular polarized light is reflected by the second mirror 113 and then turned into the horizontally polarized light by the quarter wave plate 322. This horizontally polarized light is directly transmitted through the optical phase modulator 111 and turned by the quarter wave plate 322 again into the right-circular polarized light which is radiated via first mirror 112.

In similar manner, when the present ring-shaped electro-optical modulator 300 is supplied with left-circular polarized light, this polarized light is turned into horizontally polarized light by the quarter wave plate 331. The light composed of this horizontally polarized light component is directly passed through the optical phase modulator 111 and turned into right-circular polarized light by the quarter wave plate 322. The right-circular polarized light is reflected by the second mirror 113 and then turned into the horizontally polarized light by the quarter wave plate 322. This horizontally polarized light is directly transmitted through the optical phase modulator 111 and again turned by the quarter wave plate again into the left-circular polarized light, which is radiated via first mirror 112.

In FIG. 16, the directions of light polarization of the respective polarized light components are indicated by symbols shown in the following Table 7:

TABLE 7

| explanation on polarized light | | | |
|---|---|---|---|
| 45° Polarized light | −45° Polarized light | vertically polarized light | horizontally polarized light |
| ⌀ | ⊘ | ⊙ | ⊖ |

Thus, in the ring-shaped electro-optical modulator 300, in which the quarter wave plates 331, 332 are provided ahead and in rear of the optical phase modulator 111, only two polarized light components, crossing each other, may be propagated within the optical phase modulator 111. The directions of light polarization in these two polarized light components, crossing each other, differ from each other depending on the directions of light propagation in the optical phase modulator 111. However, the routes of propagation and the optical distances of the two polarized light components remain the same. Consequently, the optical resonator 110 is itself degenerated concerning the light beams having two polarized light components crossing each other. In this case, high efficiency phase modulation may be achieved without dependency upon the directions of polarization of incident light.

In particular, the ring-shaped electro-optical modulators 10, 300 may selectively be used, depending on the polarized light components of light supplied thereto, so that only two polarized light components in the optical phase modulator 111, crossing each other, will be transmitted without dependency on the directions of light polarization of the linear polarized light or the circular polarized light, thereby achieving the high modulation efficiency.

The invention claimed is:

1. An optical frequency comb generator comprising:
    oscillation means for oscillating a modulating signal of a preset frequency;
    resonator means composed of a light incident side reflecting mirror and a light exiting side reflecting mirror, parallel to said light incident side reflecting mirror, and configured for propagating light incident via said light incident side reflecting mirror in the outward path direction or in the backward path direction for causing the resonant state of the incident light; and
    optical modulating means arranged between said light incident side reflecting mirror and the light exiting side reflecting mirror, for phase-modulating the light resonant in said resonator means, responsive to said modulating signal supplied from said oscillation means, for generating a plurality of sidebands spaced apart from one another by an interval corresponding to the frequency of said modulating signals, with the frequency of the incident light as center;
    said optical modulating means including at least a light waveguide path, formed on a substrate exhibiting an electro-optical effect, and an electrode formed on said light waveguide path for propagating said modulating signal, oscillated by said oscillation means, in the outward path direction or in the backward path direction, said optical modulating means phase-modulates the light propagated in said outward path direction by said modulating signal propagated in said outward path direction, while phase-modulating the light propagated in said backward path direction by said modulating signal propagated in said backward path direction.

2. The optical frequency comb generator according to claim 1 wherein said light incident side reflecting mirror and/or the light exiting side reflecting mirror is a reflecting film formed on a light incident side end face and/or a light exiting side end face of said optical modulating means.

3. The optical frequency comb generator according to claim 1 further comprising:
    a reflector and a phase shifter, provided on one end of said electrode; said reflector reflecting the modulating signal supplied from the opposite end of said electrode; said phase shifter adjusting the phase of the reflected modulating signal.

4. The optical frequency comb generator according to claim 3 wherein said phase shifter adjusts the phase of said reflected modulating signal in dependence upon the shape of said electrode, frequency of said modulating signal and the group refractive index of said waveguide path.

5. The optical frequency comb generator according to claim 1 wherein one end of said electrode is provided with a cut point or a shorting point for reflecting the modulating signal supplied from the opposite end thereof.

6. The optical frequency comb generator according to claim 5 wherein said cut point or the shorting point in said electrode is adjusted in dependence upon the frequency of said modulating signal, phase shift at the time of reflection or the group refractive index of said waveguide path.

7. An optical resonator comprising oscillation means for oscillating a modulating signal of a preset frequency, light propagating means for propagating the light incident on one end face thereof in the outward path direction or in the backward path direction, and optical modulating means arranged between said end faces for modulating the phase of the propagated light in dependence upon said modulating signal supplied from said oscillation means; said optical modulating means including at least a light waveguide path, formed on a substrate exhibiting an electro-optical effect, and an electrode formed on said light waveguide path for propagating said modulating signal, oscillated by said oscillation means, in the outward path direction or in the backward path direction, said optical modulating means phase-modulates the light propagated in said outward path direction by said modulating signal propagated in said outward path direction, while phase-modulating the light propagated in said backward path direction by said modulating signal propagated in said backward path direction.

8. An optical modulator comprising:
separating means for separating the incident light depending on the directions of polarization, polarized light control means for controlling the direction of polarization of light components obtained on separation to the same direction, oscillation means for oscillating a modulating signal of a preset frequency, light propagating means for propagating the light incident on one end face thereof in the outward path direction or in the backward path direction, and optical modulating means arranged between said end faces for phase-modulating the propagated light in dependence upon said modulating signal supplied from said oscillating means; said optical modulating means including at least a light waveguide path, formed on a substrate exhibiting an electro-optical effect, and an electrode formed on said light waveguide path for propagating said modulating signal, oscillated by said oscillation means, in the outward path direction or in the backward path direction, said optical modulating means phase-modulates the light propagated in said outward path direction by said modulating signal propagated in said outward path direction, while phase-modulating the light propagated in said backward path direction by said modulating signal propagated in said backward path direction.

9. The optical modulator according to claim 8 wherein said light propagating means is a crystal device within which light is propagated as said light undergoes total reflection therein.

10. An optical modulator comprising:
separating means for separating the incident light depending on the directions of polarization, polarized light control means for controlling the direction of polarization of light components obtained on separation, to the same direction of polarization oscillation means for oscillating a modulating signal of a preset frequency, resonator means made up of reflecting mirrors placed parallel to each other, and configured for propagating light incident at respective different angles from said polarization control means via one of said reflecting mirrors in the outward path direction or in the backward path direction for causing the resonant state, and optical modulating means for phase-modulating the light caused to be resonant in said resonance means, responsive to said modulating signal supplied for said oscillation means; said optical modulating means including at least a light waveguide path, formed on a substrate exhibiting an electro-optical effect, and an electrode formed on said light waveguide path for propagating said modulating signal, oscillated by said oscillation means, in the outward path direction or in the backward path direction, said optical modulating means phase-modulates the light propagated in said outward path direction by said modulating signal propagated in said outward path direction, while phase-modulating the light propagated in said backward path direction by said modulating signal propagated in said backward path direction.

11. The optical modulator according to claim 10 wherein said separating means in the optical modulator is formed of a birefringent material.

12. An optical resonator comprising oscillation means for oscillating a modulating signal of a preset frequency, light propagating means for propagating the light incident on one end face thereof in the outward path direction or in the backward path direction, light reflecting means including at least one reflecting mirror provided on a light path inclusive of said light propagating means, said light reflecting means returning the light propagated from the light incident side in the light path direction to the light incident side, and optical modulating means arranged between the light incident side and said reflecting mirror and adapted for phase-modulating the propagated light depending on said modulating signal supplied from said oscillation means; said optical modulating means including at least a light waveguide path, formed on a substrate exhibiting an electro-optical effect, and an electrode formed on said light waveguide path for propagating said modulating signal, oscillated by said oscillation means, in the outward path direction or in the backward path direction, said optical modulating means phase-modulates the light propagated in said outward path direction by said modulating signal propagated in said outward path direction, while phase-modulating the light propagated in said backward path direction by said modulating signal propagated in said backward path direction.

* * * * *

UNITED STATES PATENT AND TRADEMARK OFFICE
CERTIFICATE OF CORRECTION

PATENT NO. : 7,551,342 B2  
APPLICATION NO. : 10/579262  
DATED : June 23, 2009  
INVENTOR(S) : Kourogi et al.

Page 1 of 1

It is certified that error appears in the above-identified patent and that said Letters Patent is hereby corrected as shown below:

IN THE SPECIFICATION

At column 13, line 32, please replace "11" with "111" so that the corresponding sentence reads - Specifically, the light beams passing back and forth through the optical phase modulator 111 are set in a resonant state by repeated reflection therein. -

Signed and Sealed this

Eleventh Day of August, 2009

David J. Kappos  
*Director of the United States Patent and Trademark Office*